(12) United States Patent
Bhandary

(10) Patent No.: US 11,562,238 B2
(45) Date of Patent: Jan. 24, 2023

(54) METHOD AND SYSTEM FOR SOLVING A PREDICTION PROBLEM

(71) Applicant: AVANSEUS HOLDINGS PTE. LTD., Bugis Junction (SG)

(72) Inventor: Chiranjib Bhandary, Bangalore (IN)

(73) Assignee: Avanseus Holdings Pte. Ltd., Bugis Junction (SG)

(*) Notice: Subject to any disclaimer, the term of this patent is extended or adjusted under 35 U.S.C. 154(b) by 365 days.

(21) Appl. No.: 16/878,945

(22) Filed: May 20, 2020

(65) Prior Publication Data
US 2021/0319310 A1 Oct. 14, 2021

(30) Foreign Application Priority Data
Apr. 3, 2020 (IN) .............................. 202011014817

(51) Int. Cl.
*G06N 3/08* (2006.01)
*G06N 3/04* (2006.01)
*G06N 7/00* (2006.01)

(52) U.S. Cl.
CPC .............. *G06N 3/08* (2013.01); *G06N 3/0445* (2013.01); *G06N 7/005* (2013.01)

(58) Field of Classification Search
CPC ......... G06N 3/08; G06N 3/0445; G06N 7/005
USPC ........................................................ 706/30
See application file for complete search history.

(56) References Cited

U.S. PATENT DOCUMENTS

| | | | |
|---|---|---|---|
| 2008/0101709 A1* | 5/2008 | Guleryuz | H04N 19/46 375/E7.211 |
| 2016/0139242 A1* | 5/2016 | Dupray | G01S 5/0252 455/456.1 |

* cited by examiner

*Primary Examiner* — Fitwi Y Hailegiorgis
(74) *Attorney, Agent, or Firm* — Renner, Otto, Boisselle & Sklar, LLP

(57) ABSTRACT

Embodiments of the invention provide a method and system for solving a prediction problem. The computer-implemented method comprises: decomposing a target sequence associated with the prediction problem into a binary sequence group including at least one binary sequence, wherein each binary sequence in the group is generated based on a corresponding multiplier value; generating a plurality of elementary sequences based on each composite sequence in the binary sequence group; determining initial weights of each composite sequence based on average of weights of the corresponding elementary sequences; determining a binary prediction value for each binary sequence, wherein the binary prediction value for each composite sequence is determined by modelling each composite sequence using RNN based on the determined initial weights; and determining a real prediction value for the target sequence based on a product of the binary prediction value for each binary sequence and the corresponding multiplier value.

25 Claims, 8 Drawing Sheets

METHOD AND SYSTEM FOR SOLVING A PREDICTION PROBLEM

CROSS-REFERENCE TO RELATED APPLICATION

The present application claims priority under 35 U.S.C. § 119(a) to Indian Application No. 202011014817, filed 3 Apr. 2020, the entirety of which is hereby incorporated herein by reference.

FIELD OF INVENTION

The invention relates to sequence prediction associated with a technical problem, e.g. machine failure, network congestion, etc., more particularly, the invention relates to a method and system for solving a prediction problem which work for any sequence with arbitrary length and temporal dependency.

BACKGROUND

Sequence prediction has many applications, e.g. machine failure prediction, network congestion prediction, prediction of ink level of a printer, and prediction of bandwidth utilization of a communication line etc. Basically, a prediction problem is to estimate a future value of a quantity of interest based on a sequence of past values of the quantity over a time period. Success of a prediction process is judged by how well the predicted values match with the actual values of the quantity of interest.

The prediction process can be considered as an optimization process, which tries to adjust its parameters of a functional relationship in such a way that it generates the sequence by capturing the internal representation of the process, which might have generated the actual values. The difficulty in modelling these kinds of sequences is to find the parameter values of the model in a consistent way, which does not consume too much time. The challenge is to find a generic and robust mechanism, which works for all sequences, small or large and having small or large temporal dependencies and can be computed quickly.

Recurrent neural networks (RNNs) have been widely used for sequence prediction as RNNs which have recurrent connections are naturally suitable for sequence learning. However, standard RNNs can't handle large temporal dependencies, typically not more than 15 time steps, because of vanishing and exploding gradient problems. Although several algorithms including LSTM and GRU have been proposed to try to avoid the vanishing and exploding gradient problems, these algorithms are complex and a specialized structure of network is required. Further, none of the existing algorithms can ensure that a sequence can be modelled always within a reasonable time period, especially in the presence of a long temporal relationship.

SUMMARY OF INVENTION

Embodiments of the invention propose a standard RNN based universal prediction solution which is suitable for a sequence with arbitrary length and arbitrary depth of temporal dependency, and can eliminate the vanishing and exploding gradient problems and reduce convergence time without introducing any structural change According to one aspect of the invention, a computer-implemented method for solving a prediction problem is provided. The method comprises:

decomposing, by a computer system comprising at least one processor, a target sequence associated with the prediction problem into a binary sequence group which includes at least one binary sequence, wherein each binary sequence in the binary sequence group is generated based on a corresponding multiplier value;

generating, by the computer system, a plurality of elementary sequences based on each composite sequence in the binary sequence group;

determining, by the computer system, initial weights of each composite sequence in the binary sequence group based on average of weights of the corresponding elementary sequences;

determining, by the computer system, a binary prediction value for each binary sequence in the binary sequence group, wherein the binary prediction value for each composite sequence in the binary sequence group is determined by modelling each composite sequence using RNN based on the determined initial weights; and determining, by the computer system, a real prediction value for the target sequence based on a product of the binary prediction value for each binary sequence in the binary sequence group and the corresponding multiplier value.

According to a second aspect of the invention, a system for solving a prediction problem is provided. The system comprises at least one processor and a memory communicably coupled to the at least one processor, wherein the memory is configured to store instructions to be executed by the at least one processor, wherein the at least one processor is configured to decompose a target sequence associated with the prediction problem into a binary sequence group which includes at least one binary sequence, wherein each binary sequence in the binary sequence group is generated based on a corresponding multiplier value;

generate a plurality of elementary sequences based on each composite sequence in the binary sequence group;

determine initial weights of each composite sequence in the binary sequence group based on average of weights of the corresponding elementary sequences;

determine a binary prediction value for each binary sequence in the binary sequence group, wherein the binary prediction value for each composite sequence is determined by modelling each composite sequence using RNN based on the determined initial weights; and determine a real prediction value for the target sequence based on a product of the binary prediction value for each binary sequence in the binary sequence group and the corresponding multiplier value.

According to a third aspect of the invention, a non-transitory computer readable medium comprising computer program code for solving a prediction problem, wherein the computer program code, when executed, is configured to cause at least one processor in a computer system to perform a method for solving a prediction problem proposed by embodiments of the invention.

With the proposed prediction method and system, a target sequence associated with a prediction problem is decomposed into a binary sequence group and a real prediction value for the target sequence is determined based on the binary prediction values of the binary sequences in the binary sequence group. The binary prediction values of each composite sequence in the binary sequence group are determined by running a standard RNN with initial weights which are determined based on average of weights of a group of elementary sequences generated from the composite sequence. As the initial weights of each composite sequence are very close to the final weights at convergence, each binary sequence always converges without getting into vanishing or exploding gradient problems and convergence time gets reduced. Further, as the prediction of the binary sequences in the binary sequence group may be conducted in parallel, the computation time required for prediction will be significantly reduced.

BRIEF DESCRIPTION OF THE DRAWINGS

The invention will be described in detail with reference to the accompanying drawings, in which.

DETAILED DESCRIPTION OF EMBODIMENTS OF THE INVENTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention.

Embodiments described in the context of a method are analogously valid for a system, and vice versa. Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

As used herein, the articles "a", "an" and "the" as used with regard to a feature or element include a reference to one or more of the features or elements.

As used herein, the term "configured to" is interchangeable with "operative to" or "adapted to".

Embodiments of the invention provide a universal solution for a sequence prediction problem. In this solution, a generic target sequence is converted into a binary sequence group so that prediction results of the target sequence can be determined based on prediction values of all of the binary sequences in the binary sequence group.

Figure 1A:
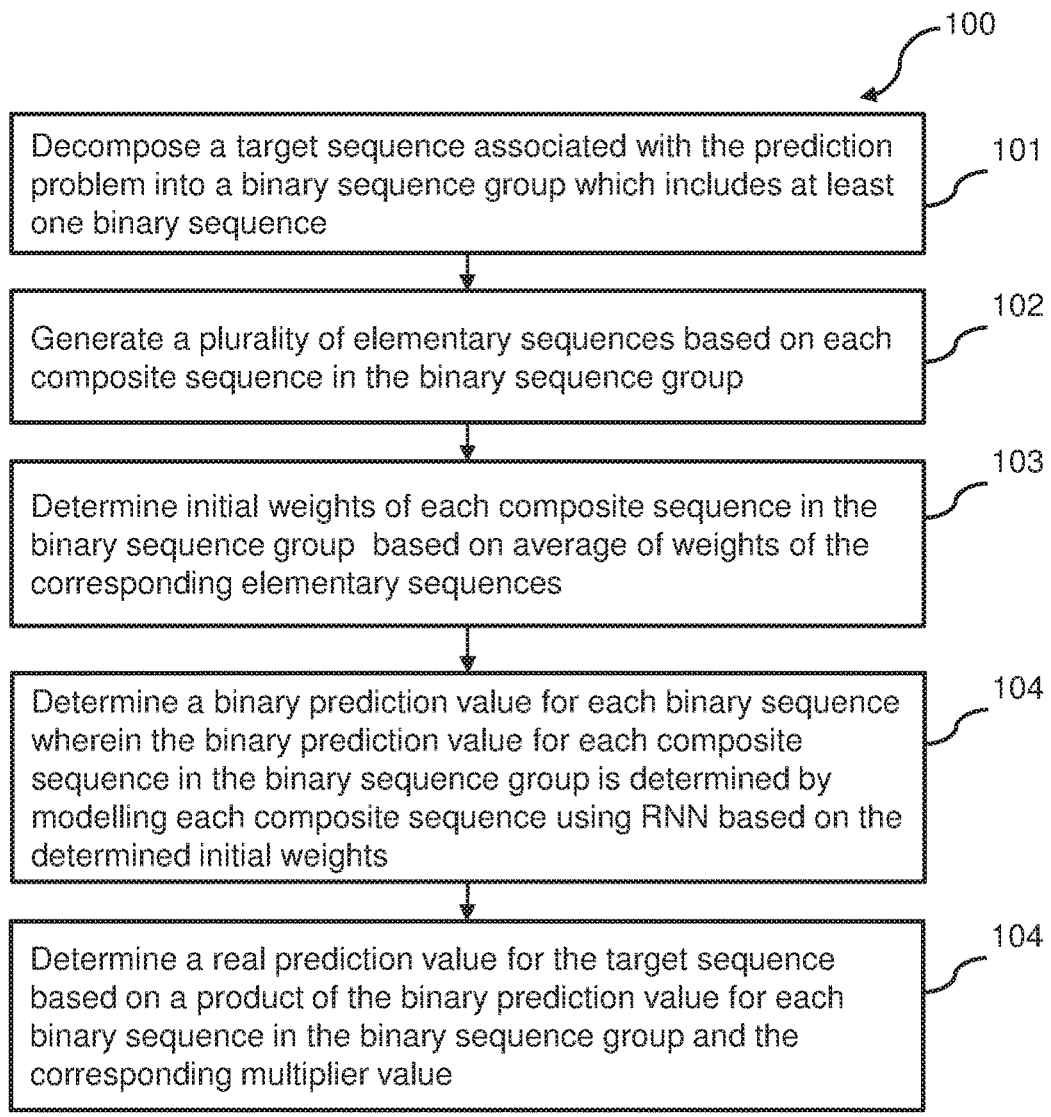
FIG. 1A is a flowchart illustrating a computer-implemented method for solving a prediction problem according to some embodiments of the invention.

FIG. 1A is a flowchart illustrating a computer-implemented method 100 for solving a prediction problem according to some embodiments of the invention. In embodiments of the invention, the method may be executed by a computer system which comprises at least one processor and a memory communicably coupled to the at least one processor, wherein the memory is configured to store instructions to be executed by the at least one processor.

In block 101, a target sequence associated with the prediction problem is decomposed into a binary sequence group which includes at least one binary sequence, wherein each binary sequence in the binary sequence group is generated based on a corresponding multiplier value.

It should be noted that in some embodiments of the invention, the generated binary sequence group may only include one binary sequence, while in other embodiments of the invention; the generated binary sequence group may include a plurality of binary sequences. In some embodiments, the multiplier value used for generating each binary sequence may be same or different. In some Zo embodiments, a predetermined multiplier value may be used for generating all of the binary sequences in the binary sequence group.

Figure 1B:
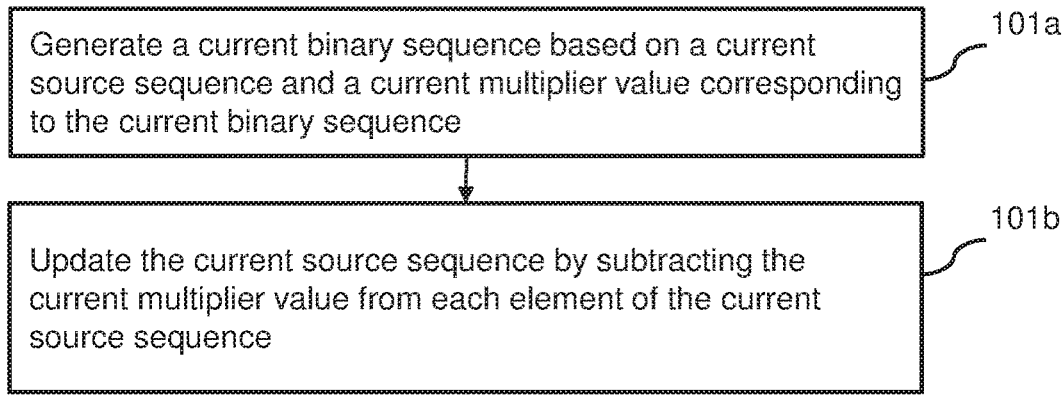
FIG. 1B is a flowchart illustrating a method for decomposing a generic target sequence into a binary sequence group according to some embodiments of the invention.

FIG. 1B is a flowchart illustrating a method for decomposing a generic target sequence into a binary sequence group according to some embodiments of the invention.

In block 101a, a current binary sequence is generated based on a current source sequence and a current multiplier value corresponding to the current binary sequence, wherein the current multiplier value may be determined based on a minimum non-zero value of elements of the current source sequence. The initial source sequence is the target sequence. In one embodiment, the current multiplier may be determined to be equal to the minimum non-zero value of elements of the current source sequence.

In one embodiment, each element of the current binary sequence may be determined based on the following rules:

If an element of the current source sequence is greater than or equal to the current multiplier value, the corresponding element of the current binary sequence is determined as 1; if the element of the current source sequence is 0, the corresponding element of the current binary sequence is determined as 0.

In block 101b, the current source sequence is updated by subtracting the current multiplier value from each element of the current source sequence.

Repeating the steps in block 101a and 101b until each element of the current source sequence is zero.

Take the target sequence below as an example to explain the method for decomposing the target sequence into a binary sequence group.

{0.4, 0.3, 0.2, 0.5, 0.7}
Iteration-1
Current source sequence: {0.4, 0.3, 0.2, 0.5, 0.7}
Current multiplier value: 0.2 equal to the minimum non-zero value of elements of the current source sequence
Current binary sequence: {1, 1, 1, 1, 1}
Updated current source sequence: {0.2, 0.1, 0.0, 0.3, 0.5}
Iteration-2
Current source sequence: {0.2, 0.1, 0.0, 0.3, 0.5}
Current multiplier value: 0.1 equal to the minimum non-zero value of elements of the current source sequence
Current binary sequence: {1, 1, 0, 1, 1}
Updated current source sequence: {0.1, 0.0, 0.0, 0.2, 0.4}
Iteration-3
Current source sequence: {0.1, 0.0, 0.0, 0.2, 0.4}
Current multiplier value: 0.1 equal to the minimum non-zero value of elements of the current source sequence
Current binary sequence: {1, 0, 0, 1, 1}
Updated current source sequence: {0.0, 0.0, 0.0, 0.1, 0.3}
Iteration-4
Current source sequence: {0.0, 0.0, 0.0, 0.1, 0.3}
Current multiplier value: 0.1 equal to the minimum non-zero value of elements of the current source sequence
Current binary sequence: {0, 0, 0, 1, 1}
Updated current source sequence: {0.0, 0.0, 0.0, 0.0, 0.2}
Iteration-5
Current source sequence: {0.0, 0.0, 0.0, 0.0, 0.2}
Current multiplier value: 0.2 equal to the minimum non-zero value of elements of the current source sequence
Current binary sequence: {0, 0, 0, 0, 1}
Updated current source sequence: {0.0, 0.0, 0.0, 0.0, 0.0}

In the example above, the generated binary sequence group and the corresponding multiplier values are set out in the Table 1 below:

TABLE 1

| Binary sequence Group | Multiplier value |
| --- | --- |
| 1, 1, 1, 1, 1 | 0.2 |
| 1, 1, 0, 1, 1 | 0.1 |
| 1, 0, 0, 1, 1 | 0.1 |
| 0, 0, 0, 1, 1 | 0.1 |
| 0, 0, 0, 0, 1 | 0.2 |

It should be noted that a generic target sequence may be decomposed into different binary sequence groups depending on the predetermined conversion rules and the selection of multiplier values. Further, since decomposition is additive in nature, alternate binary sequence groups for the same target sequence may be generated by swapping at least one element between rows having same multiplier value in an original generated binary sequence group. Following this way, many alternate binary sequence groups for the same target sequence may be generated.

For example, as the top row and bottom row of the generated binary sequence group in Table 1 have the same multiplier value of 0.2, an alternate binary sequence group as shown in Table 2 may be generated based on the binary sequence group in Table 1 by swapping the first and fourth elements between top row and bottom row of the binary sequence group in Table 1, i.e. swapping 1 and 1 in top row with 0 and 0 in bottom row of the binary sequence group in Table 1.

TABLE 2

| Binary sequence Group | Multiplier Value |
| --- | --- |
| 0, 1, 1, 0, 1 | 0.2 |
| 1, 1, 0, 1, 1 | 0.1 |
| 1, 0, 0, 1, 1 | 0.1 |
| 0, 0, 0, 1, 1 | 0.1 |
| 1, 0, 0, 1, 1 | 0.2 |

In block 102, a plurality of elementary sequences are generated based on each composite sequence in the binary sequence group.

In embodiments of this invention, an elementary sequence refers to a binary sequence in which the indicator 1 repeats at a regular interval, i.e. all of the basic memory depth values included in an elementary sequence are same. Further, the sequence length of an elementary sequence is at least the minimum length required for solving a prediction problem. A composite sequence refers to a binary sequence in which the indicator 1 happens in irregular intervals, i.e. composite sequence includes a plurality of different basic memory depth values.

This step is conducted to convert each composite sequence in the binary sequence group into a group of elementary sequences. For the elementary sequence in the binary sequence group if any, this step is not necessary.

In some embodiments of the invention, each of the elementary sequences generated based on a composite sequence may start with 1 and repeat a base sequence from the composite sequence perfectly and contains at least two and half repetitions of the base sequence.

In block 103, initial weights of each composite sequence in the binary sequence group are determined based on average of weights of the corresponding elementary sequences, i.e. the constituent elementary sequences of each composite sequence.

In some embodiments, the weights of at least one elementary sequence corresponding to a first composite sequence may be pre-determined and retrieved from a pre-stored table. Accordingly, the initial weights of the first composite sequence may be determined by the following steps:

retrieving weights of at least one elementary sequences corresponding to the first composite sequence from a pre-stored table which is stored in a memory and includes a plurality of mappings wherein each mapping associates a set of weights to an elementary sequence, and calculating the initial weights of the first composite sequence based on the retrieved weights of the at least one elementary sequence corresponding to the first composite sequence.

In some embodiments, the weights of all elementary sequences generated based on a composite sequence in the binary sequence group may be pre-determined and retrieved from a pre-stored table.

In some embodiments, the weights of at least one elementary sequence corresponding to a second composite sequence may be determined by modelling the at least one elementary sequence using RNN to obtain weights of the at least elementary sequence. Accordingly, the initial weights of the second composite sequence may be determined by the following steps:

modelling at least one elementary sequence corresponding to a second composite sequence using RNN to obtain weights of the at least one of the corresponding elementary sequences; and calculating the initial weights of the second composite sequence based on the obtained weights of the at least one corresponding elementary sequence.

It should be noted that the first composite sequence and the second composite sequence may be the same sequence or different sequence in the binary sequence group. It means that to determine initial weights of any composite sequence in the binary sequence group, weights of all corresponding elementary sequences may be retrieved from a pre-stored table, or obtained by modelling all of the corresponding elementary sequences using RNN, or weights of at least one corresponding elementary sequence are retrieved from a pre-stored table and weights of at least one corresponding elementary sequence are obtained by modelling the at least one corresponding elementary sequence using RNN.

To further reduce the computation time substantially, the compute system may be configured to model a plurality of elementary sequences generated based on the composite sequences using RNN in parallel.

Furthermore, an elementary sequence may be modelled using weights of a simpler elementary sequence. In other words, initial weights of an elementary sequence may be determined based on weights of a simpler elementary sequence. Here, a simpler elementary sequence means an elementary sequence with less number of contagious 1 s or less number of contagious 0 s.

Figure 2:
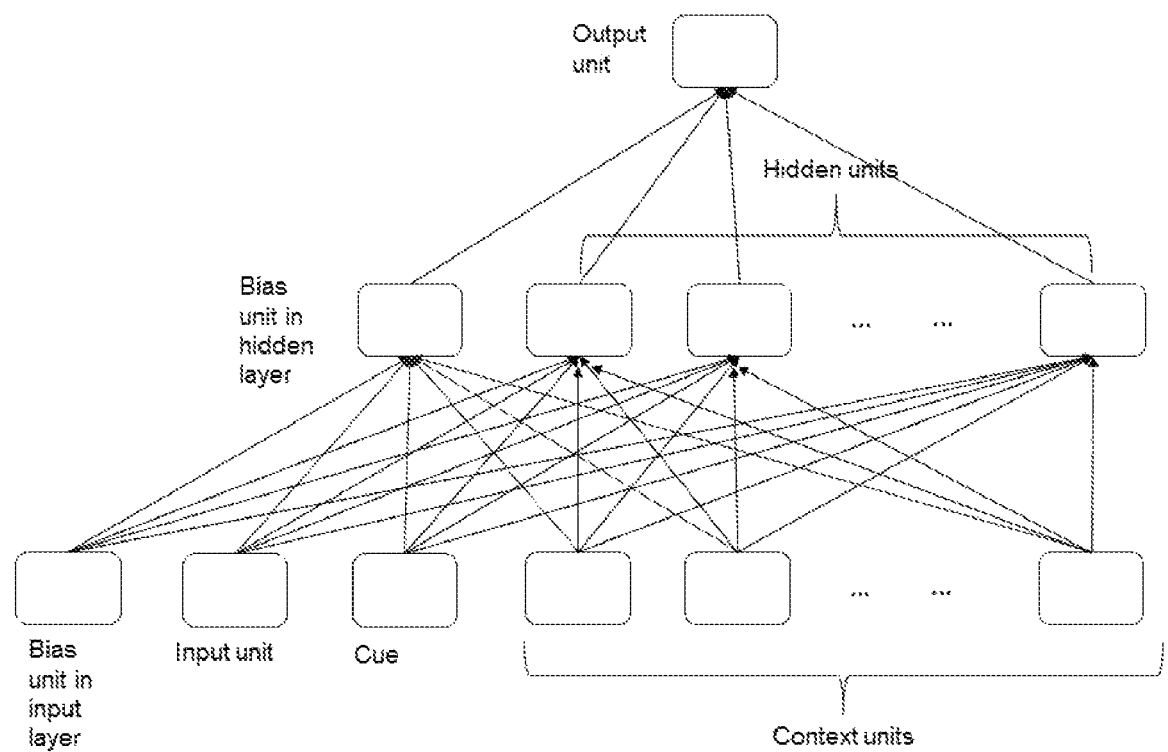
FIG. 2 shows structure of RNN used for modelling an elementary or binary sequence according to some embodiments of the invention.

FIG. 2 shows structure of RNN used for modelling a sub-binary or binary sequence according to some embodiments of the invention. RNN is trained using Back Propagation Through Time (BPTT). As shown in FIG. 2, a cue unit in the input layer is used as an aid to remember long time gaps. In some embodiments of the invention, a value of the cue unit may be calculated as the number of time steps from the most recent event occurrence, e.g. the most recent machine failure, divided by 100.

In block 104, a binary prediction value for each binary sequence in the binary sequence group is determined, wherein the binary prediction value for each composite sequence in the binary sequence group is determined by modelling each composite sequence using RNN based on the determined initial weights.

In some embodiments, the method may further comprise: determining initial learning rate of each composite sequence in the binary sequence group based on average of initial learning rates of the corresponding elementary sequences, i.e. constituent elementary sequences thereof.

In some embodiments, the method may further comprise: determining an error threshold value for each composite sequence in the binary sequence group based on average of error threshold values of the corresponding elementary sequences, i.e. constituent elementary sequences thereof.

In block 105, a real prediction value for the target sequence is determined based on a product of the binary prediction value for each binary sequence in the binary sequence group and the corresponding multiplier value.

Specifically, if the binary sequence group includes only one binary sequence, the real prediction value at a time step for the target sequence may be determined as the product of a binary prediction value at the same time step for the binary sequence and the multiplier value corresponding to the binary sequence.

If the binary sequence group includes a plurality of binary sequences, the real prediction value at a time step for the target sequence may be determined as a weighted sum of binary prediction values at the same time step for the binary sequences in the binary sequence group. Specifically, the real prediction value at a time step may be determined by the following steps:

calculating a product of the binary prediction value at the same time step for each binary sequence in the binary sequence group and the corresponding multiplier value;

determining the real prediction value for the target sequence at the time step as an addition of the products corresponding to all of the binary sequences in the binary sequence group.

EXAMPLES

For illustrative purpose, the following examples are provided to further explain the method and system for solving a prediction problem proposed in embodiments of the invention.

Example-1

A first target sequence associated with the prediction problem in this example is as follows:

{0.1, 0.2, 0.3, 0.4, 0.2, 0.3, 0.4, 0.5, 0.3, 0.4, 0.5, 0.6, 0.4, 0.5, 0.6, 0.1, 0.2, 0.3, 0.4, 0.2, 0.3, 0.4, 0.5, 0.3, 0.4, 0.5, 0.6, 0.4, 0.5, 0.6, 0.1, 0.2, 0.3, 0.4, 0.2, 0.3}

Figure 3:
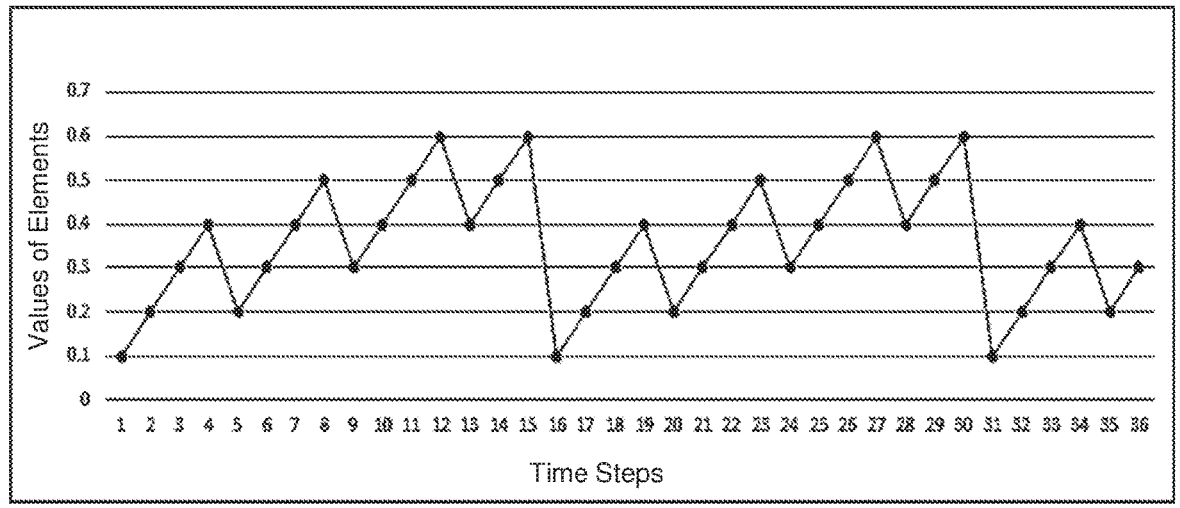
FIG. 3 is a line graph showing variation of elements in a first target sequence over time according to Example-1.

In the first target sequence, the first fifteen elements have been repeated twice. FIG. 3 is a line graph showing variation of elements in the first target sequence over time according to Example-1.

Generate Binary Sequence Group

The first target sequence may be converted into the binary sequence group based on the predetermined multiplier values as shown in Table 3 below.

TABLE 3

| Binary sequence Group | Multiplier value |
|---|---|
| 1 1 1 1 1 1 1 1 1 1 1 1 1 1 1 1 1 1 1 1 1 1 1 1 1 1 1 1 1 1 1 1 1 1 1 1 | 0.1 |
| 2 0 1 1 1 1 1 1 1 1 1 1 1 1 1 1 0 1 1 1 1 1 1 1 1 1 1 1 1 1 1 0 1 1 1 1 1 | 0.1 |
| 3 0 0 1 1 0 1 1 1 1 1 1 1 1 1 1 0 0 1 1 0 1 1 1 1 1 1 1 1 1 1 0 0 1 1 0 1 | 0.1 |
| 4 0 0 0 1 0 0 1 1 0 1 1 1 1 1 1 0 0 0 1 0 0 1 1 0 1 1 1 1 1 1 0 0 0 1 0 0 | 0.1 |
| 5 0 0 0 0 0 0 0 1 0 0 1 1 0 1 1 0 0 0 0 0 0 0 1 0 0 1 1 0 1 1 0 0 0 0 0 0 | 0.1 |
| 6 0 0 0 0 0 0 0 0 0 0 0 1 0 0 1 0 0 0 0 0 0 0 0 0 0 0 1 0 0 1 0 0 0 0 0 0 | 0.1 |

The original prediction problem is now decomposed into six independent sub-problems, i.e. six binary sequence prediction problems. These six sub-problems may be solved in parallel to further reduce the prediction time.

It should be noted that the multiplier values may be predetermined based on the non-zero minimum value of the elements in the current source sequence. It may include only one decimal digit, i.e. from 0.1 to 0.9, or have higher precision depending on the values of the elements in the first target sequence, e.g. if the elements include 2 decimal digits, the multiplier values may be a value between 0.01 to 0.99.

Generate Elementary Sequences for Each Composite Sequence

The first binary sequence Binary-1 is an elementary sequence. It is a continuing sequence of 1 s and hence a trivial prediction problem. Each of the remaining binary sequences Binary-2 to Binary-6 is a composite sequence. Table 4 to Table 8 below show the elementary sequences, i.e. sub-binary sequences, generated based on the Binary-2 to Binary-6 respectively. The elementary sequences generated based on each binary sequence are named as sub-binary-i-j representing the $j^{th}$ sub-binary sequence generated based on the $i^{th}$ binary sequence Binary-i.

TABLE 4

| | |
|---|---|
| Binary-2 | 0 1 1 1 1 1 1 1 1 1 1 1 1 1 1 0 1 1 1 1 1 1 1 1 1 1 1 1 1 0 1 1 1 1 1 |
| Sub-binary-2-1 | 1 1 1 1 1 1 1 1 1 1 1 1 1 1 1 0 1 1 1 1 1 1 1 1 1 1 1 1 1 0 1 1 1 1 1 1 1 1 1 1 1 |
| Sub-binary-2-2 | 1 1 1 1 1 0 1 1 1 1 1 0 1 1 1 1 1 |

TABLE 5

| | |
|---|---|
| Binary-3 | 0 0 1 1 0 1 1 1 1 1 1 1 1 1 1 0 0 1 1 0 1 1 1 1 1 1 1 1 1 1 0 0 1 1 0 1 |
| Sub-binary-3-1 | 1 1 0 0 1 1 0 0 1 1 |
| Sub-binary-3-2 | 1 1 1 1 1 1 1 1 1 1 0 1 1 1 1 1 1 1 1 1 1 0 1 1 1 1 1 1 1 1 1 |
| Sub-binary-3-3 | 1 0 1 0 1 |

TABLE 6

| | |
|---|---|
| Binary-4 | 0 0 0 1 0 0 1 1 0 1 1 1 1 1 1 0 0 0 1 0 0 1 1 0 1 1 1 1 1 1 0 0 0 1 0 0 |
| Sub-binary-4-1 | 1 0 0 0 1 0 0 0 1 |
| Sub-binary-4-2 | 1 1 0 0 1 1 0 0 1 1 |
| Sub-binary-4-3 | 1 1 1 1 1 1 0 1 1 1 1 1 1 0 1 1 1 1 1 1 |

TABLE 7

| | |
|---|---|
| Binary-5 | 0 0 0 0 0 0 0 1 0 0 1 1 0 1 1 0 0 0 0 0 0 0 1 0 0 1 1 0 1 1 0 0 0 0 0 0 |
| Sub-binary-5-1 | 1 0 0 0 0 0 0 0 1 0 0 0 0 0 0 0 1 |
| Sub-binary-5-2 | 1 1 0 0 1 1 0 0 1 1 |
| Sub-binary-5-3 | 1 1 0 1 1 0 1 1 |

TABLE 8

| | |
|---|---|
| Binary-6 | 0 0 0 0 0 0 0 0 0 0 1 0 0 1 0 0 0 0 0 0 0 0 0 0 0 1 0 0 1 0 0 0 0 0 0 |
| Sub-binary-6-1 | 1 0 0 0 0 0 0 0 0 0 0 0 1 0 0 0 0 0 0 0 0 0 0 0 1 |
| Sub-binary-6-2 | 1 0 0 1 0 0 1 |

As shown in Tables 4-8 above, each sub-binary or elementary sequence generated based on a binary sequence has the following properties:
1. starting with sequence of 1 s;
2. perfectly repeating a base sequence;
3. containing two and half repetitions of the base sequence since this is the minimum number of repetitions for any system to discern the pattern, for example, the base sequence of the sub-binary 2-1 is 1 1 1 1 1 1 1 1 1 1 1 1 1 0.

Determine Initial Weights of Each Composite Sequence

In this example, each sub-binary sequence is modelled using RNN to determine the weights between input and hidden units at convergence. The initial weights of each of Binary-2 to Binary-6 can be determined based on average of the weights of all corresponding sub-binary or elementary sequences, i.e. the constituent sequences of each binary sequence. For example, the initial weights of Binary-2 can be determined based on average of the weights of sub-binary-2-1 and sub-binary-2-2.

In this example, to determine weights of each sub-binary sequence or binary sequence, RNN may be run based on the following parameters:

Number of hidden units: 50

Initial weights between input and hidden units: random between −1.35 to +1.35 for each sub-binary or elementary sequence, wherein the initial weights of each binary sequence are determined as average of weights of constituent sub-binary sequences, Initial values of weights between hidden and output units: random between −0.5 to +0.5 for both binary and sub-binary sequences Initial learning rate: For each sub-binary sequence, initial learning rate is determined experimentally, typically lies in the range of 1.5 to 5.5. For each binary sequence, initially learning rate is determined by average of initial learning rates of constituent sub-binary sequences.

Backtrack steps: 20

Error threshold: For each sub-binary sequence, error threshold is determined experimentally starting from 0.01 and then reducing in steps of 0.005. For each binary sequence, error threshold is determined based on error thresholds of constituent sub-binary sequences according to the following equation (1):

Error threshold=average of error thresholds of constituent sub-binary sequences+0.0005*(variance of count of 1's in sub-binary sequences+variance of count of 0's in sub-binary sequences)   (1)

The equation is generated based on a principle which has been proved by experiments that error threshold should increase as the sequence becomes more irregular. The irregularity is measured by variances as mentioned above.

Table 9 below shows the learning schedule, based on vector distance error, used for each sub-binary sequence and binary sequence in Example-1.

TABLE 9

| Error | Learning rate (eta) |
| --- | --- |
| Initial | Elementary sequence: Based on experimentation Binary sequence: Average of initial learning rates of constituent elementary sequences |
| <.8 | eta/6 |
| <.6 | eta/2 |
| <.4 | eta/2 |
| <.2 | eta/2 |

Once sub-binary sequences are modelled, weights of constituent sub-binary sequences are averaged and used to model a corresponding binary sequence. Details of modelling sub-binary sequence and binary sequences are provided in Table 10 below.

TABLE 10

| Sequence | Initial learning rate | Error threshold | Epoch count |
| --- | --- | --- | --- |
| Binary-1 | — | — | — |
| Binary-2 | 2.9 | 0.01 | 63 |
| Sub-binary-2-1 | 3.2 | 0.001 | 3973 |
| Sub-binary-2-2 | 2.3 | 0.001 | 1033 |
| Binary-3 | 3.0 | 0.01 | 217 |
| Sub-binary-3-1 | 2.8 | 0.01 | 247 |
| Sub-binary-3-2 | 3.2 | 0.001 | 1846 |
| Sub-binary-3-3 | 3.0 | 0.01 | 86 |
| Binary-4 | 3.2 | 0.01 | 190 |
| Sub-binary-4-1 | 3.9 | 0.01 | 311 |
| Sub-binary-4-2 | 2.8 | 0.01 | 247 |
| Sub-binary-4-3 | 2.4 | 0.001 | 1148 |
| Binary-5 | 3.1 | 0.01 | 221 |
| Sub-binary-5-1 | 3.4 | 0.01 | 278 |
| Sub-binary-5-2 | 2.8 | 0.01 | 247 |
| Sub-binary-5-3 | 3.2 | 0.005 | 547 |
| Binary-6 | 3.34 | 0.01 | 105 |
| Sub-binary-6-1 | 3.5 | 0.01 | 329 |
| Sub-binary-6-2 | 3.2 | 0.01 | 295 |

Prediction Values for the First Target Sequence

Binary prediction values for the next 9 time steps for the binary sequences are provided in Table 11 below:

TABLE 11

Binary - 1, Multiplier-1: 0.1
Sequence: 1 1 1 1 1 1 1 1 1 1 1 1 1 1 1 1 1 1 1 1 1 1 1 1 1 1 1 1 1 1 1 1 1 1 1 1 → 1 1 1 1 1 1 1 1 1
Binary- 2, Multiplier-2: 0.1
Sequence: 0 1 1 1 1 1 1 1 1 1 1 1 1 1 1 0 1 1 1 1 1 1 1 1 1 1 1 1 1 1 0 1 1 1 1 1 → 1 1 1 1 1 1 1 1 1
Binary- 3, Multiplier-3: 0.1
Sequence: 0 0 1 1 0 1 1 1 1 1 1 1 1 1 0 0 1 1 0 1 1 1 1 1 1 1 1 1 1 0 0 1 1 0 1 → 1 1 1 1 1 1 1 1 1
Binary- 4, Multiplier-4: 0.1
Sequence: 0 0 0 1 0 0 1 1 0 1 1 1 1 1 1 0 0 0 1 0 0 1 1 0 1 1 1 1 1 1 0 0 0 1 0 0 → 1 1 0 1 1 1 1 1 1
Binary- 5, Multiplier-5: 0.1
Sequence: 0 0 0 0 0 0 0 1 0 0 1 1 0 1 1 0 0 0 0 0 0 0 1 0 0 1 1 0 1 1 0 0 0 0 0 0 → 0 1 0 0 1 1 0 1 1
Binary- 6, Multiplier-6: 0.1
Sequence: 0 0 0 0 0 0 0 0 0 0 0 1 0 0 1 0 0 0 0 0 0 0 0 0 0 0 0 1 0 0 1 0 0 0 0 0 0 → 0 0 0 0 0 1 0 0 1

The real prediction value at a time step a may be calculated according to the following Equation (2):

$$P_{real}(a)=\Sigma_{i=1}^{n}(P_{binary}(a)-i*\text{multiplier}-i)$$   (2)

In Equation (2), $P_{real}$ (a) refers to real prediction value at the time step a, $P_{binary}$(a)–i refers to the binary prediction value at the time step a for the $i^{th}$ binary sequence, multiplier–i refers to the multiplier value corresponding to the $i^{th}$ binary sequence, and n refers to the number of binary sequences in the binary sequence group generated based on the target sequence.

According to Equation (2), the following highlighted real prediction values for the next 9 time steps for the first target sequence are obtained:

0.1 0.2 0.3 0.4 0.2 0.3 0.4 0.5 0.3 0.4 0.5 0.6 0.4 0.5 0.6 0.1 0.2 0.3 0.4 0.2 0.3 0.4 0.5 0.3 0.4 0.5 0.6 0.4 0.5 0.6 0.1 0.2 0.3 0.4 0.2 0.3→0.4 0.5 0.3 0.4 0.5 0.6 0.4 0.5 0.6

For example, the real prediction value at the time step 37 is calculated as 1X0.1+1X0.1+1X0.1+1X0.1+0X0.1+0X0.1=0.4

Figure 4:
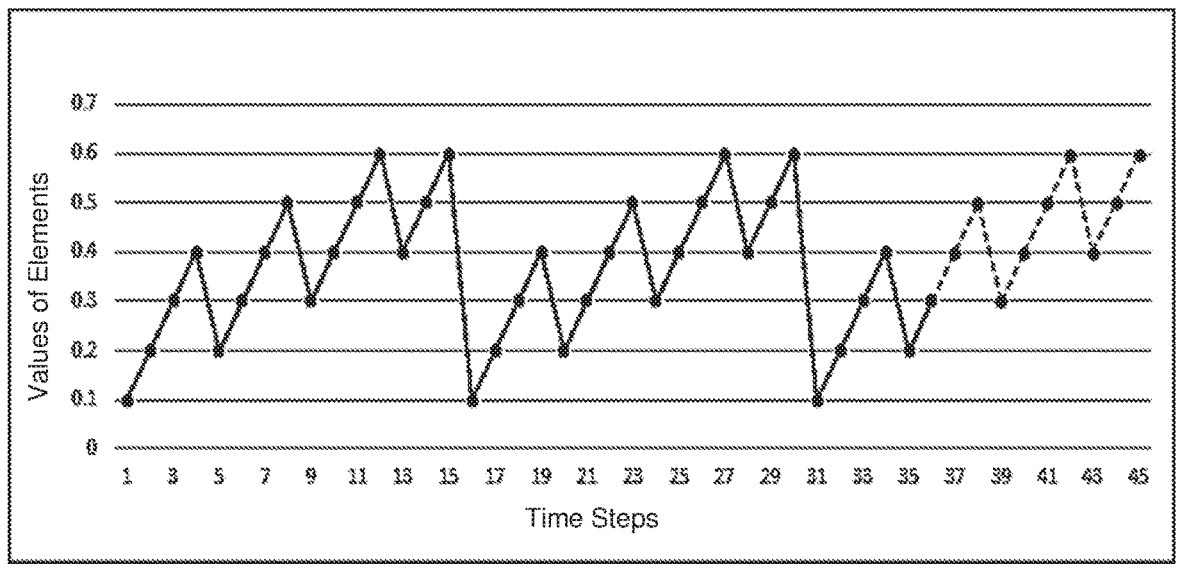
FIG. 4 is a line graph showing 9 real prediction values for the first target sequence alongside the first target sequence for visual comparison according to Example-1.

FIG. 4 is a line graph showing the 9 real prediction values for the first target sequence alongside the first target sequence for visual comparison according to Example-1. As can be seen, the 9 real prediction values are as expected since they follow the pattern perfectly.

Example-2

In the second example, the proposed prediction method is applied to a sequence which is not perfectly repeating and more representative of real life situations. The objective is to prove how well the real life prediction problem can be solved using the proposed prediction method.

A second target sequence in this example is as follows:
{0.1, 0.2, 0.3, 0.4, 0.2, 0.3, 0.4, 0.5, 0.3, 0.4, 0.5, 0.6, 0.4, 0.5, 0.6, 0.1, 0.2, 0.3, 0.1, 0.2, 0.3, 0.4, 0.2, 0.3, 0.4, 0.5, 0.6, 0.3, 0.5, 0.6, 0.1, 0.2, 0.3, 0.4, 0.2, 0.3}

Figure 5:
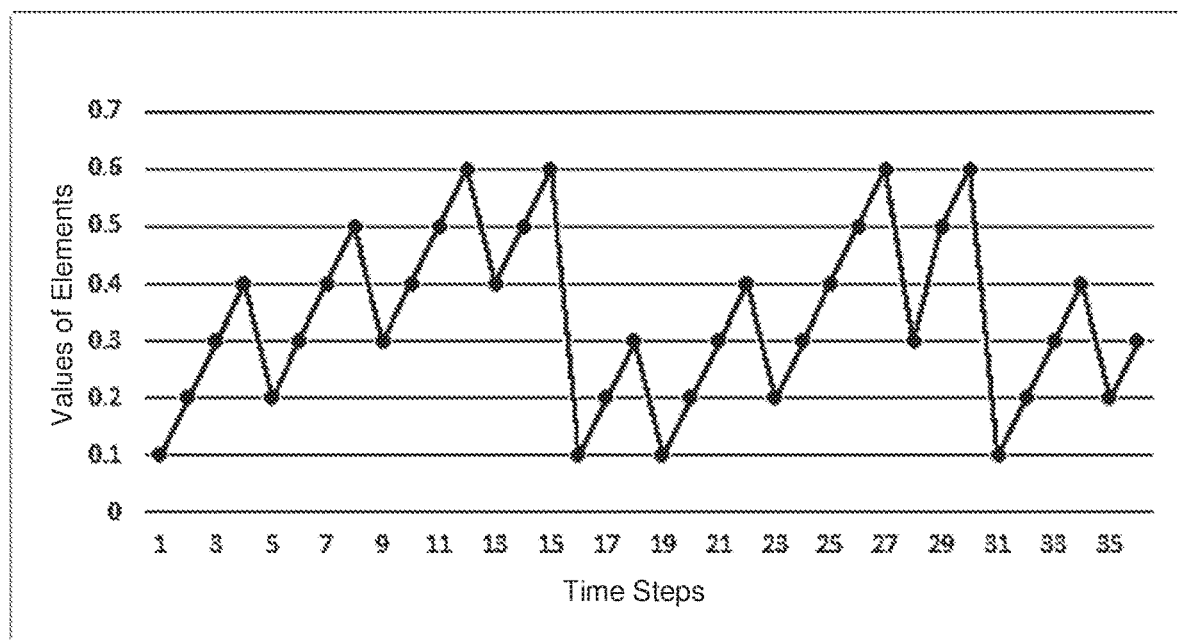
FIG. 5 is a line graph showing the variation of elements of a second target sequence over time according to Example-2.

FIG. 5 is a line graph showing the variation of elements of the second target sequence over time according to Example-2. As shown in FIG. 5, the elements of the sequences do not form a perfect pattern over time but an overall trend can be identified.

Generate Binary Sequence Group and Elementary Sequences for Each Composite Sequence A binary sequence group is generated based on the second target sequence and the corresponding multipliers. In other words, the second target sequence is decomposed into a group of binary sequences based on corresponding multipliers. For each composite sequence in the binary sequence group, a group of sub-binary or elementary sequences are generated.

Table 12 below shows the binary sequences generated based on the second target sequence, along with the corresponding multipliers and sub-binary or elementary sequences generated for each composite sequence according to Example-2.

TABLE 12

Binary-1: 1 1 1 1 1 1 1 1 1 1 1 1 1 1 1 1 1 1 1 1 1 1 1 1 1 1 1 1 1 1 1 1, Multiplier: 0.1
Trivial prediction problem since prediction values will always be 1 for future time steps
Binary-2: 0 1 1 1 1 1 1 1 1 1 1 1 1 1 1 0 1 1 0 1 1 1 1 1 1 1 1 1 1 0 1 1 1 1 1, Multiplier: 0.1
Sub-binary-2-1: 1 1 1 1 1 1 1 1 1 1 1 1 1 1 1 0 1 1 1 1 1 1 1 1 1 1 1 1 1 1 0 1 1 1 1 1 1 1 1 1 1 1 1 1
Sub-binary-2-2: 1 1 0 1 1 0 1 1
Sub-binary-2-3: 1 1 1 1 1 1 1 1 1 1 1 0 1 1 1 1 1 1 1 1 1 1 1 1 1 0 1 1 1 1 1 1 1 1 1 1 1
Sub-binary-2-4: 1 1 1 1 1 0 1 1 1 1 1 0 1 1 1 1 1
Binary-3: 0 0 1 1 0 1 1 1 1 1 1 1 1 1 1 0 0 1 0 0 1 1 0 1 1 1 1 1 1 1 0 0 1 1 0 1, Multiplier: 0.1
Sub-binary-3-1: 1 1 0 0 1 1 0 0 1 1
Sub-binary-3-2: 1 1 1 1 1 1 1 1 1 1 1 0 1 1 1 1 1 1 1 1 1 1 0 1 1 1 1 1 1 1 1 1
Sub-binary-3-3: 1 0 0 1 0 0 1
Sub-binary-3-4: 1 1 1 1 1 1 1 0 1 1 1 1 1 1 1 0 1 1 1 1 1 1 1
Sub-binary-3-5: 1 0 1 0 1
Binary-4: 0 0 0 1 0 0 1 1 0 1 1 1 1 1 1 0 0 0 0 0 0 1 0 0 1 1 1 0 1 1 0 0 0 1 0 0, Multiplier: 0.1
Sub-binary-4-1: 1 0 0 0 1 0 0 0 1
Sub-binary-4-2: 1 1 0 0 1 1 0 0 1 1
Sub-binary-4-3: 1 1 1 1 1 1 1 0 1 1 1 1 1 1 0 1 1 1 1 1 1
Sub-binary-4-4: 1 0 0 0 0 0 0 1 0 0 0 0 0 0 1
Sub-binary-4-5: 1 1 1 0 0 1 1 1 0 0 1 1 1
Sub-binary-4-6: 1 1 0 1 1 0 1 1
Binary-5: 0 0 0 0 0 0 0 1 0 0 1 1 0 1 1 0 0 0 0 0 0 0 0 0 0 0 1 1 0 1 1 0 0 0 0 0 0, Multiplier: 0.1
Sub-binary-5-1: 1 0 0 0 0 0 0 0 1 0 0 0 0 0 0 0 1
Sub-binary-5-2: 1 1 0 0 1 1 0 0 1 1
Sub-binary-5-3: 1 1 0 1 1 0 1 1
Sub-binary-5-4: 1 1 0 0 0 0 0 0 0 0 0 1 1 0 0 0 0 0 0 0 0 0 1 1
Binary-6: 0 0 0 0 0 0 0 0 0 0 1 0 0 1 0 0 0 0 0 0 0 0 0 0 0 1 0 0 1 0 0 0 0 0 0, Multiplier: 0.1
Sub-binary-6-1: 1 0 0 0 0 0 0 0 0 0 0 0 1 0 0 0 0 0 0 0 0 0 0 1
Sub-binary-6-2: 1 0 0 1 0 0 1

Determine Initial Weights of Each Composite Sequence

In this example, weights of each sub-binary sequence are determined by running RNN based on the parameters shown in Table 13 below. Initial weights of each composite sequence in the binary sequence group are determined as average of weights of constituent sub-binary sequences. Table 13 below shows the details of prediction of sub-binary sequences and binary sequences.

TABLE 13

| Sequence | Initial learning rate | Error threshold | Epoch count |
|---|---|---|---|
| Binary - 1 | — | — | — |
| Binary- 2 | 2.75 | 0.013 | 282 |
| Sub-binary-2-1 | 3.2 | 0.001 | 3973 |
| Sub-binary-2-2 | 3.2 | 0.005 | 547 |
| Sub-binary-2-3 | 2.3 | 0.001 | 2095 |
| Sub-binary-2-4 | 2.3 | 0.001 | 1033 |
| Binary- 3 | 2.9 | 0.01 | 186 |
| Sub-binary-3-1 | 2.8 | 0.01 | 247 |
| Sub-binary-3-2 | 3.2 | 0.001 | 1846 |
| Sub-binary-3-3 | 3.2 | 0.01 | 295 |
| Sub-binary-3-4 | 2.5 | 0.001 | 1079 |
| Sub-binary-3-5 | 3.0 | 0.01 | 86 |
| Binary - 4 | 3.0 | 0.01 | 212 |
| Sub-binary-4-1 | 3.9 | 0.01 | 311 |
| Sub-binary-4-2 | 2.8 | 0.01 | 247 |
| Sub-binary-4-3 | 2.4 | 0.001 | 1148 |
| Sub-binary-4-4 | 3.4 | 0.01 | 231 |
| Sub-binary-4-5 | 2.9 | 0.01 | 276 |
| Sub-binary-4-6 | 3.2 | 0.005 | 247 |
| Binary- 5 | 3.2 | 0.01 | 274 |
| Sub-binary-5-1 | 3.4 | 0.01 | 278 |
| Sub-binary-5-2 | 2.8 | 0.01 | 247 |
| Sub-binary-5-3 | 3.2 | 0.005 | 547 |
| Sub-binary-5-4 | 3.5 | 0.01 | 236 |
| Binary- 6 | 3.34 | 0.02 | 104 |
| Sub-binary-6-1 | 3.5 | 0.01 | 329 |
| Sub-binary-6-2 | 3.2 | 0.01 | 295 |

Prediction Values for the Second Target Sequence

The computer system determines binary prediction values for the next 9 time steps for each binary sequence in the binary sequence group by running RNN based on the parameters shown in Table 13 above. Table 14 shows the binary prediction values for the next 9 time steps for all of the binary sequences according to Example-2.

TABLE 14

Binary - 1, Multiplier-1: 0.1
Sequence: 1 1 1 1 1 1 1 1 1 1 1 1 1 1 1 1 1 1 1 1 1 1 1 1 1 1 1 1 1 1 1 1 → 1 1 1 1 1 1 1 1 1
Binary- 2, Multiplier-2: 0.1
Sequence: 0 1 1 1 1 1 1 1 1 1 1 1 1 1 1 0 1 1 0 1 1 1 1 1 1 1 1 1 0 1 1 1 1 → 1 1 1 1 1 1 1 1 1
Binary- 3, Multiplier-3: 0.1
Sequence: 0 0 1 1 0 1 1 1 1 1 1 1 1 1 1 0 0 1 0 0 1 1 0 1 1 1 1 1 1 1 0 0 1 1 0 1 → 1 0 1 1 1 1 1 1 1
Binary- 4, Multiplier-4: 0.1
Sequence: 0 0 0 1 0 0 1 1 0 1 1 1 1 1 1 0 0 0 0 0 0 1 0 0 1 1 1 0 1 1 0 0 0 1 0 0 → 1 1 0 1 1 1 0 0 1
Binary- 5, Multiplier-5: 0.1
Sequence: 0 0 0 0 0 0 0 1 0 0 1 1 0 1 1 0 0 0 0 0 0 0 0 0 0 0 1 1 0 1 1 0 0 0 0 0 0 0 → 0 0 0 0 1 1 0 1 1
Binary- 6, Multiplier-6: 0.1
Sequence: 0 0 0 0 0 0 0 0 0 0 0 1 0 0 1 0 0 0 0 0 0 0 0 0 0 0 0 0 1 0 0 1 0 0 0 0 0 0 → 0 0 0 0 0 1 0 0 1

The computer system determines real prediction values for the next 9 time steps for the second target sequence according to Equation (2). In this example, the real prediction values for the next 9 time steps are listed below:
{0.1, 0.2, 0.3, 0.4, 0.2, 0.3, 0.4, 0.5, 0.3, 0.4, 0.5, 0.6, 0.4, 0.5, 0.6, 0.1, 0.2, 0.3, 0.1, 0.2, 0.3, 0.4, 0.2, 0.3, 0.4, 0.5, 0.6, 0.3, 0.5, 0.6, 0.1, 0.2, 0.3, 0.4, 0.2, 0.3} → 0.4, 0.3, 0.3, 0.4, 0.5, 0.6, 0.3, 0.4, 0.6

Figure 6:
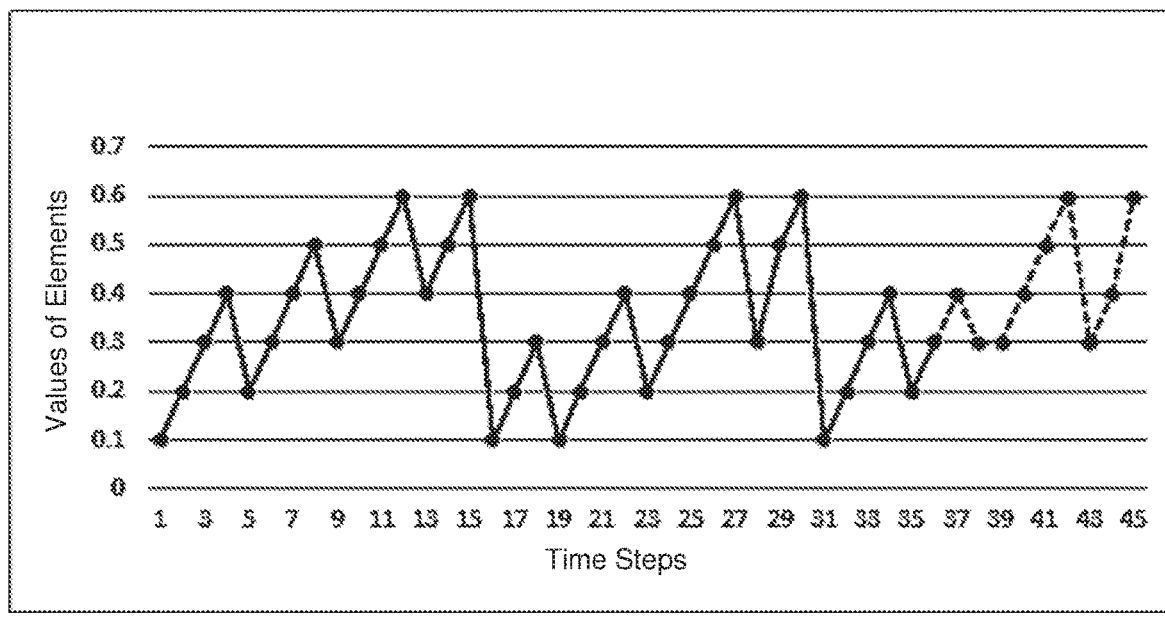
FIG. 6 is a line graph showing 9 real prediction values for the second target sequence alongside the second target sequence for visual comparison according to the Example-2.

FIG. 6 is a line graph showing 9 real prediction values for the second target sequence alongside the second target sequence for visual comparison according to the Example-2. It can be seen from FIG. 6 that the real prediction values for the next 9 time steps of the second target sequence follow the pattern and algorithm well.

Since weights of elementary sequences can be pre-computed, the real computations involved in the embodiments of the invention may be indicated by the sum of epochs for binary sequences. Also, since binary sequences can be modelled in parallel, if GPU or other parallel computing hardware is used for prediction, the time required for prediction is indicated by the maximum number of epochs among those needed for the binary sequences generated based on the target sequence. Table 15 below lists the epoch counts along with memory depths for Example-1 and Example-2. Memory depth is the number of time steps that the algorithm has to remember to be able to predict properly. In other words, it is the maximum depth of temporal dependence.

TABLE 15

| Problem | Memory depth | Max epoch of binary sequences |
|---|---|---|
| Example - 1 | 15 | 221 |
| Example - 2 | 15 | 282 |

To compare the computation load of the embodiments of the invention with the existing standard RNN method, i.e. standard RNN without decomposition of the target sequence into binary sequences, the two target sequences in Example-1 and Example-2 are also modelled using the existing standard RNN. The error threshold and initial learning rate is chosen in such a way that prediction output is correct to keep epoch count minimum. Table 16 below shows the number of epochs required when the existing standard RNN is used.

TABLE 16

| Problem | Initial learning rate | Error threshold | Number of epochs |
|---|---|---|---|
| Example - 1 | 2 | 0.01 | 272 |
| Example - 2 | 2.8 | 0.01 | 1027 |

As can be seen from Table 15 and Table 16, compared to the existing standard RNN method, time required by the method proposed by embodiments of this invention, when run on parallel hardware, is almost same for Example-1 and substantially less for Example-2.

To establish that the method proposed by embodiments of the invention always works without vanishing or exploding gradient problems and takes less time than the existing standard RNN method, the proposed method is applied to the following four test prediction problems having higher memory depth (>100).

Test Problem-1
A Third Target Sequence

{0.1 0.2 0.4 0.5 0.7 0.8 0 0 0 0 0
0 0 0 0 0 1 0.9 0.6 0.3 0 0.1
0.2 0.3 0.2 0.1 0 1 1 0 0 0 0
0 0 0 0 0 0 0 0 0 0 0
1 1 0.8 0.6 0.4 0.2 0 0.1 0.2 0.4 0.5
0.7 0.8 0 0 0 0 0 0 0 0 0
0 0 0 0 0 0 0.9 0.6 0.3 0.1 0
0 0 0 0 0 0 0 0 0 0.1 0.2
0.3 0.2 0.1 0 1 1 0.5 1 1 0.5 0
0 0 0 0 0 0 0 0 0 0 0
0 0 0 0 0 0 0 1 1 1
0.8 0.6 0.4 0.2 0 0.1 0.2 0.4 0.5 0.7 0.8
0 0 0 0 0 0 0 0 0 0 0
0 0 0 0 0.9 0.6 0.3 0.1 0 0 0
0 0 0.2 0.4 0.6 0.8 1 0.1 0.2 0.4 0.5
0.7 0.8 0 0 0 0 0 0 0 0 0
0 1 0.9 0.6 0.3 0 0.1 0.2 0.3 0.2 0.1
0 1 1 0 0 0 0 0 0 0 0
0 0 0 0 0 0 0 1 1 0.8 0.6
0.4 0.2 0 0.1 0.2 0.4 0.5 0.7 0.8 0 0
0 0 0 0 0 0 0 0 0 0 0
0 0 0.9 0.6 0.3 0.1 0 0 0 0 0
0 0 0 0 0 0.1 0.2 0.3 0.2 0.1 0
1 1 0.5 1 1 0.5 0 0 0 0 0
0 0 0 0 0 0 0 0 0 0 0
0 0 0 0 1 1 1 0.8 0.6 0.4 0.2
0 0.1 0.2 0.4 0.5 0.7 0.8 0 0 0 0
0 0 0 0 0 0 0 0 0 0 0
0.9 0.6 0.3 0.1 0 0 0 0 0 0.2 0.4
0.6 0.8 1 0.1 0.2 0.4 0.5 0.7 0.8 0 0
0 0 0 0 0 0 0 0 1 0.9 0.6
0.3 0 0.1 0.2 0.3 0.2 0.1 0 1 1 0
0 0 0 0 0 0 0 0 0 0 0
0 0 0 1 1 0.8 0.6 0.4 0.2 0 0.1
0.2 0.4 0.5 0.7 0.8 0 0 0 0 0 0
0 0 0 0 0 0 0 0 0 0.9 0.6
0.3 0.1 0 0 0 0 0 0 0 0 0
0 0.1 0.2 0.3 0.2 0.1 0 1 1 0.5 1
1}

Computations

Details of binary and elementary sequences modelling are set out in Table 17 below. There are 10 binary sequences in the binary sequence group generated based on the third target sequence. The 10 binary sequences are not shown in this document as the sizes of the sequences are too big. Similarly, elementary sequences are just mentioned below but actual sequences are not included due to length.

TABLE 17

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| 1 | 0.1 | | | | 3.08 | 0.03 | 210 |
| | | 1(1) | 6 | 10 | 4.0 | 0.01 | 242 |
| | | 2(3) | 4 | 1 | 1.9 | 0.001 | 965 |
| | | 3(6) | 5 | 1 | 2.3 | 0.001 | 1033 |
| | | 4(3) | 2 | 15 | 4.2 | 0.01 | 243 |
| | | 5(3) | 6 | 1 | 2.4 | 0.001 | 1148 |
| | | 6(5) | 6 | 15 | 3.8 | 0.01 | 247 |
| | | 7(3) | 4 | 10 | 3.4 | 0.01 | 226 |
| | | 8(2) | 6 | 20 | 3.8 | 0.01 | 365 |
| | | 9(2) | 7 | 1 | 2.5 | 0.001 | 1079 |
| | | 10(2) | 4 | 5 | 3.2 | 0.01 | 170 |
| | | 11(2) | 11 | 10 | 3.6 | 0.01 | 158 |
| 2 | 0.1 | | | | 3.29 | 0.03 | 147 |
| | | 1(3) | 5 | 1 | 2.3 | 0.001 | 1033 |
| | | 2(3) | 4 | 10 | 3.4 | 0.01 | 226 |
| | | 3(3) | 3 | 2 | 2.9 | 0.01 | 276 |
| | | 4(3) | 2 | 2 | 2.8 | 0.01 | 247 |
| | | 5(3) | 6 | 15 | 3.8 | 0.01 | 247 |
| | | 6(3) | 5 | 2 | 2.9 | 0.01 | 388 |
| | | 7(5) | 3 | 15 | 3.8 | 0.01 | 283 |
| | | 8(3) | 3 | 12 | 4.0 | 0.01 | 185 |
| | | 9(2) | 6 | 2 | 2.8 | 0.01 | 487 |
| | | 10(2) | 7 | 20 | 3.9 | 0.01 | 327 |
| | | 11(2) | 5 | 6 | 3.8 | 0.01 | 219 |
| 3 | 0.1 | | | | 3.6 | 0.03 | 300 |
| | | 1(3) | 4 | 2 | 2.8 | 0.01 | 278 |
| | | 2(3) | 4 | 10 | 3.4 | 0.01 | 226 |
| | | 3(3) | 1 | 3 | 3.9 | 0.01 | 311 |
| | | 4(3) | 2 | 3 | 3.8 | 0.01 | 237 |
| | | 5(3) | 5 | 15 | 4.0 | 0.01 | 222 |
| | | 6(5) | 4 | 4 | 2.8 | 0.01 | 144 |
| | | 7(5) | 3 | 15 | 3.8 | 0.01 | 283 |
| | | 8(3) | 1 | 13 | 4.3 | 0.01 | 352 |
| | | 9(2) | 6 | 3 | 3.8 | 0.01 | 380 |
| | | 10(2) | 6 | 20 | 3.8 | 0.01 | 364 |
| | | 11(2) | 4 | 7 | 3.5 | 0.01 | 141 |
| | | 12(1) | 5 | 3 | 3.8 | 0.01 | 387 |
| 4 | 0.1 | | | | 3.7 | 0.03 | 304 |
| | | 1(3) | 4 | 2 | 2.8 | 0.01 | 278 |
| | | 2(3) | 3 | 10 | 4.1 | 0.01 | 216 |
| | | 3(3) | 2 | 8 | 4.2 | 0.01 | 193 |
| | | 4(3) | 5 | 15 | 4.0 | 0.01 | 222 |
| | | 5(5) | 4 | 4 | 2.8 | 0.01 | 144 |
| | | 6(5) | 2 | 15 | 4.2 | 0.01 | 243 |
| | | 7(2) | 6 | 18 | 3.9 | 0.01 | 341 |
| | | 8(2) | 6 | 20 | 3.8 | 0.01 | 364 |
| | | 9(2) | 4 | 8 | 4.0 | 0.01 | 207 |
| | | 10(1) | 5 | 18 | 3.9 | 0.01 | 236 |
| 5 | 0.1 | | | | 3.93 | 0.02 | 117 |
| | | 1(3) | 3 | 3 | 3.4 | 0.01 | 238 |
| | | 2(3) | 3 | 10 | 4.1 | 0.01 | 216 |
| | | 3(3) | 2 | 8 | 4.2 | 0.01 | 193 |
| | | 4(3) | 4 | 15 | 3.9 | 0.01 | 187 |
| | | 5(5) | 3 | 6 | 3.7 | 0.01 | 169 |
| | | 6(5) | 2 | 15 | 4.2 | 0.01 | 243 |
| | | 7(2) | 6 | 18 | 3.9 | 0.01 | 341 |
| | | 8(2) | 5 | 20 | 4.1 | 0.01 | 245 |
| | | 9(2) | 3 | 9 | 3.9 | 0.01 | 169 |
| | | 10(1) | 5 | 18 | 3.9 | 0.01 | 236 |
| 6 | 0.1 | | | | 4.0 | 0.03 | 108 |
| | | 1(3) | 2 | 4 | 4.0 | 0.01 | 211 |
| | | 2(3) | 3 | 10 | 4.1 | 0.01 | 216 |
| | | 3(3) | 2 | 8 | 4.2 | 0.01 | 193 |
| | | 4(3) | 4 | 15 | 3.9 | 0.01 | 187 |
| | | 5(5) | 2 | 7 | 4.1 | 0.01 | 157 |
| | | 6(5) | 2 | 15 | 4.2 | 0.01 | 243 |
| | | 7(3) | 2 | 18 | 3.9 | 0.01 | 303 |

TABLE 17-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
|  |  | 8(3) | 2 | 1 | 3.2 | 0.005 | 547 |
|  |  | 9(2) | 5 | 21 | 4.2 | 0.01 | 294 |
|  |  | 10(2) | 3 | 9 | 3.9 | 0.01 | 169 |
| 7 | 0.1 |  |  |  | 3.8 | 0.03 | 1429 |
|  |  | 1(3) | 2 | 4 | 4.0 | 0.01 | 211 |
|  |  | 2(3) | 2 | 10 | 3.5 | 0.01 | 236 |
|  |  | 3(3) | 2 | 9 | 3.9 | 0.01 | 159 |
|  |  | 4(3) | 3 | 15 | 3.8 | 0.01 | 283 |
|  |  | 5(5) | 2 | 8 | 4.2 | 0.01 | 193 |
|  |  | 6(5) | 1 | 15 | 4.0 | 0.01 | 388 |
|  |  | 7(3) | 2 | 19 | 3.9 | 0.01 | 346 |
|  |  | 8(3) | 2 | 1 | 3.2 | 0.005 | 547 |
|  |  | 9(2) | 4 | 21 | 4.1 | 0.01 | 300 |
|  |  | 10(2) | 2 | 11 | 3.4 | 0.01 | 263 |
| 8 | 0.1 |  |  |  | 3.78 | 0.02 | 724 |
|  |  | 1(3) | 1 | 5 | 3.4 | 0.01 | 247 |
|  |  | 2(3) | 2 | 10 | 3.5 | 0.01 | 236 |
|  |  | 3(3) | 2 | 9 | 3.9 | 0.01 | 159 |
|  |  | 4(3) | 3 | 15 | 3.8 | 0.01 | 283 |
|  |  | 5(5) | 1 | 9 | 4.2 | 0.01 | 257 |
|  |  | 6(5) | 1 | 15 | 4.0 | 0.01 | 388 |
|  |  | 7(3) | 2 | 19 | 3.9 | 0.01 | 346 |
|  |  | 8(3) | 2 | 1 | 3.2 | 0.005 | 547 |
|  |  | 9(2) | 4 | 21 | 4.1 | 0.01 | 300 |
|  |  | 10(2) | 2 | 11 | 3.4 | 0.01 | 263 |
| 9 | 0.1 |  |  |  | 3.9 | 0.04 | 265 |
|  |  | 1(3) | 2 | 16 | 3.9 | 0.01 | 285 |
|  |  | 2(3) | 2 | 9 | 3.9 | 0.01 | 159 |
|  |  | 3(3) | 2 | 15 | 4.2 | 0.01 | 243 |
|  |  | 4(5) | 1 | 26 | 3.9 | 0.01 | 334 |
|  |  | 5(3) | 2 | 19 | 3.9 | 0.01 | 346 |
|  |  | 6(3) | 2 | 1 | 3.2 | 0.005 | 547 |
|  |  | 7(2) | 3 | 21 | 3.9 | 0.01 | 296 |
|  |  | 8(2) | 1 | 12 | 4.1 | 0.01 | 302 |
| 10 | 0.1 |  |  |  | 3.4 | 0.12 | 473 |
|  |  | 1(3) | 1 | 16 | 3.9 | 0.01 | 383 |
|  |  | 2(3) | 2 | 10 | 3.5 | 0.01 | 236 |
|  |  | 3(3) | 2 | 15 | 4.2 | 0.01 | 243 |
|  |  | 4(3) | 2 | 46 | 1.7 | 0.01 | 1163 |
|  |  | 5(3) | 2 | 1 | 3.2 | 0.005 | 547 |
|  |  | 6(2) | 3 | 21 | 3.9 | 0.01 | 296 |
|  |  | 7(2) | 1 | 39 | 3.2 | 0.01 | 657 |

To solve this problem, total number of epochs required for modelling binary sequences is 4077 and the number of epochs in case of parallel execution is 1429. While to solve the same problem using the existing standard RNN with initial learning rate of 0.2 and error threshold (mean absolute deviation) of 0.01, the number of epochs required is 6431.

Prediction Values for the Third Target Sequence

Real prediction values for next 35 time steps are set out below and these are same as expected values. Therefore, the results prove that the method proposed by embodiments of the invention is suitable for sequence prediction with long temporal dependency.

| 0.5 | 0   | 0   | 0   | 0 | 0   | 0   | 0   | 0   | 0   | 0 | 0 |
| 0   | 0   | 0   | 0   | 0 | 0   | 0   | 0   | 0   | 0.9 | 1 | 1 |
| 0.8 | 0.6 | 0.4 | 0.2 | 0 | 0.1 | 0.2 | 0.3 | 0.4 | 0.6 | 0.7 |   |

Figure 7:
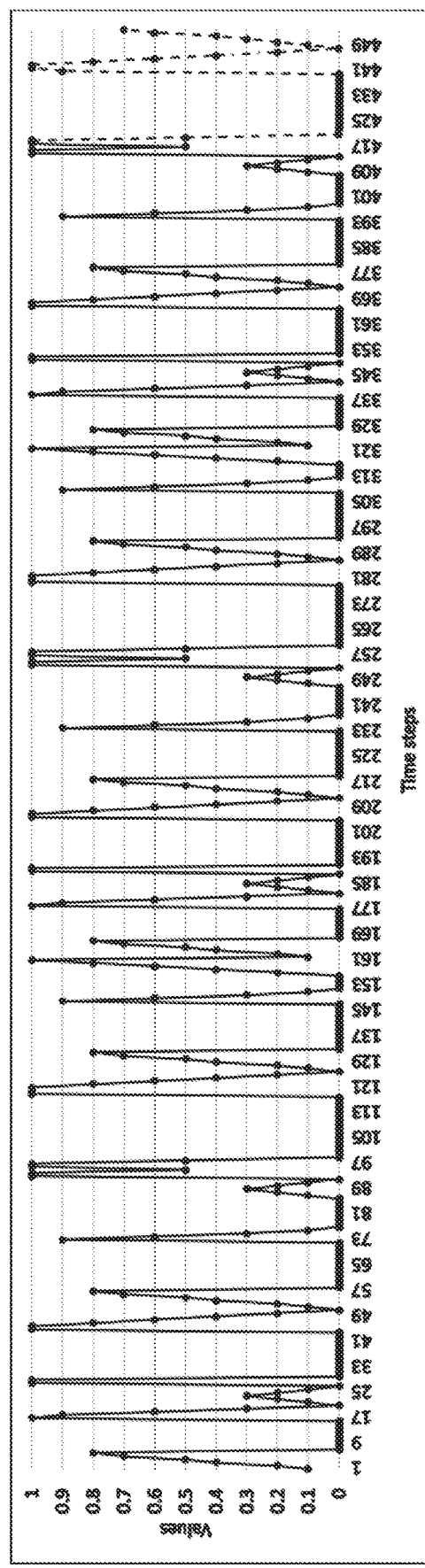
FIG. 7 is a line graph showing 35 real prediction values for a third target sequence alongside the third target sequence for visual comparison according to the test problem-1.

FIG. 7 is a line graph showing 35 real prediction values for the third target sequence alongside the third target sequence for visual comparison according to the test problem-1. As shown in FIG. 7, the prediction values for the next 35 time steps follow the pattern well.

Test Problem-2

A Fourth Target Sequence

| 0   | 0.1 | 0.5 | 0.6 | 1   | 0.2 | 0.3 | 0.4 | 0.7 | 0.8 | 0.9 |
| 1   | 0   | 0   | 0   | 0   | 0   | 0   | 0   | 0   | 0   | 0   |
| 0   | 0   | 0   | 0   | 0   | 0.1 | 0.5 | 1   | 1   | 0.1 | 0.5 |
| 0   | 0   | 0   | 0   | 0   | 0   | 0   | 0   | 0   | 0   | 0   |
| 0   | 0   | 0   | 0   | 0   | 0   | 0   | 0   | 0   | 1   | 1   |
| 1   | 0.8 | 0.6 | 0.4 | 0.2 | 0   | 0   | 0   | 0   | 0   | 0   |
| 0   | 0   | 0   | 0   | 0.1 | 0.3 | 0.5 | 0.7 | 0.9 | 1   | 1   |
| 0   | 0   | 0   | 0   | 0   | 0   | 0   | 0   | 0   | 0   | 0   |
| 0   | 0   | 0   | 0   | 0   | 0   | 0   | 0   | 0   | 0.1 | 0.5 |
| 0.6 | 0   | 0   | 0   | 0   | 0   | 0   | 0   | 0   | 0   | 0   |
| 0.2 | 0.3 | 0.4 | 0   | 0   | 0   | 0   | 0   | 0   | 0   | 0   |
| 0   | 0   | 0.7 | 0.8 | 0.9 | 1   | 0   | 0   | 0   | 0   | 0   |
| 0   | 0   | 0   | 0   | 0   | 0   | 0   | 0   | 0   | 0   | 0.8 |
| 0.6 | 0.4 | 0.2 | 0   | 0   | 0   | 0   | 0   | 0   | 0   | 0   |
| 0   | 0   | 0.1 | 0.5 | 1   | 0   | 0   | 0   | 0   | 0   | 0   |
| 0   | 0   | 0   | 0   | 0   | 0   | 0   | 0   | 0   | 0.3 | 0.3 |
| 0.2 | 0.2 | 0.1 | 0.1 | 0   | 0   | 0   | 0   | 0   | 0   | 0   |
| 0   | 0   | 0   | 0   | 1   | 1   | 0   | 0.1 | 0.5 | 0.6 | 1 | 0.2 |
| 0.3 | 0.4 | 0.7 | 0.8 | 0.9 | 1   | 0   | 0   | 0   | 0   | 0   |
| 0   | 0   | 0   | 0   | 0   | 0   | 0   | 0   | 0   | 0   | 0.1 |
| 0.5 | 1   | 1   | 0.1 | 0.5 | 0   | 0   | 0   | 0   | 0   | 0   |
| 0   | 0   | 0   | 0   | 0   | 0   | 0   | 0   | 0   | 0   | 0   |

-continued

| | | | | | | | | | | |
|---|---|---|---|---|---|---|---|---|---|---|
| 0 | 0 | 0 | 1 | 1 | 1 | 0.8 | 0.6 | 0.4 | 0.2 | 0 |
| 0 | 0 | 0 | 0 | 0 | 0 | 0 | 0 | 0 | 0.1 | 0.3 |
| 0.5 | 0.7 | 0.9 | 1 | 1 | 0 | 0 | 0 | 0 | 0 | 0 |
| 0 | 0 | 0 | 0 | 0 | 0 | 0 | 0 | 0 | 0 | 0 |
| 0 | 0 | 0 | 0.1 | 0.5 | 0.6 | 0 | 0 | 0 | 0 | 0 |
| 0 | 0 | 0 | 0 | 0 | 0.2 | 0.3 | 0.4 | 0 | 0 | 0 |
| 0 | 0 | 0 | 0 | 0 | 0 | 0 | 0.7 | 0.8 | 0.9 | 1 |
| 0 | 0 | 0 | 0 | 0 | 0 | 0 | 0 | 0 | 0 | 0 |
| 0 | 0 | 0 | 0 | 0.8 | 0.6 | 0.4 | 0.2 | 0 | 0 | 0 |
| 0 | 0 | 0 | 0 | 0 | 0 | 0 | 0.1 | 0.5 | 1 | 0 |
| 0 | 0 | 0 | 0 | 0 | 0 | 0 | 0 | 0 | 0 | 0 |
| 0 | 0 | 0 | 0.3 | 0.3 | 0.2 | 0.2 | 0.1 | 0.1 | 0 | 0 |
| 0 | 0 | 0 | 0 | 0 | 0 | 0 | 0 | 1 | 1 | 0 |
| 0.1 | 0.5 | 0.6 | 1 | 0.2 | 0.3 | 0.4 | 0.7 | 0.8 | 0.9 | 1 |
| 0 | 0 | 0 | 0 | 0 | 0 | 0 | 0 | 0 | 0 | 0 |
| 0 | 0 | 0 | 0 | 0.1 | 0.5 | 1 | 1 | 0.1 | 0.5 | 0 |
| 0 | 0 | 0 | 0 | 0 | 0 | 0 | 0 | 0 | 0 | 0 |
| 0 | 0 | 0 | 0 | 0 | 0 | 0 | 0 | 1 | 1 | 1 |
| 0.8 | 0.6 | 0.4 | 0.2 | 0 | 0 | 0 | 0 | 0 | 0 | 0 |
| 0 | 0 | 0 | 0.1 | 0.3 | 0.5 | 0.7 | 0.9 | 1 | 1 | 0 |
| 0 | 0 | 0 | 0 | 0 | 0 | 0 | 0 | 0 | 0 | 0 |
| 0 | 0 | 0 | 0 | 0 | 0 | 0 | 0 | 0.1 | 0.5 | 0.6 |
| 0 | 0 | 0 | 0 | 0 | 0 | 0 | 0 | 0 | 0 | 0.2 |
| 0.3 | 0.4 | 0 | 0 | 0 | 0 | 0 | 0 | 0 | 0 | 0 |
| 0 | 0.7 | 0.8 | 0.9 | 1 | 0 | 0 | 0 | 0 | 0 | 0 |
| 0 | 0 | 0 | 0 | 0 | 0 | 0 | 0 | 0 | 0 | 0.8 |

Computations

Details of binary and elementary sequences modelling are set out in Table 18 below. There are 10 binary sequences in the binary sequence group generated based on the fourth target sequence. The 10 binary sequences are not shown in this document as the sizes of the sequences are too big. Similarly, elementary sequences are just mentioned below but actual sequences are not included due to length.

TABLE 18

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| 1 | 0.1 | | | | 3.7 | 0.03 | 85 |
| | | 1(3) | 11 | 1 | 2.3 | 0.001 | 2095 |
| | | 2(5) | 6 | 15 | 3.8 | 0.01 | 247 |
| | | 3(3) | 7 | 20 | 3.9 | 0.01 | 327 |
| | | 4(3) | 7 | 10 | 3.7 | 0.01 | 176 |
| | | 5(3) | 3 | 20 | 3.9 | 0.01 | 309 |
| | | 6(5) | 3 | 10 | 4.1 | 0.01 | 216 |
| | | 7(3) | 4 | 10 | 3.4 | 0.01 | 226 |
| | | 8(2) | 4 | 15 | 3.9 | 0.01 | 187 |
| | | 9(2) | 2 | 10 | 3.5 | 0.01 | 236 |
| | | 10(1) | 1 | 15 | 4.0 | 0.01 | 388 |
| 2 | 0.1 | | | | 3.7 | 0.03 | 235 |
| | | 1(3) | 10 | 2 | 3.1 | 0.01 | 543 |
| | | 2(3) | 3 | 16 | 3.9 | 0.01 | 229 |
| | | 3(3) | 1 | 1 | 3 | 0.01 | 86 |
| | | 4(3) | 7 | 20 | 3.9 | 0.01 | 327 |
| | | 5(3) | 6 | 11 | 3.6 | 0.01 | 169 |
| | | 6(3) | 2 | 21 | 4.6 | 0.01 | 458 |
| | | 7(3) | 3 | 10 | 4.1 | 0.01 | 216 |
| | | 8(3) | 4 | 10 | 3.4 | 0.01 | 226 |
| | | 9(4) | 4 | 15 | 3.9 | 0.01 | 187 |
| | | 10(2) | 2 | 11 | 3.4 | 0.01 | 263 |
| | | 11(2) | 2 | 12 | 3.8 | 0.01 | 257 |
| | | 12(1) | 1 | 15 | 4.0 | 0.01 | 388 |
| 3 | 0.1 | | | | 3.56 | 0.03 | 235 |
| | | 1(3) | 3 | 2 | 2.9 | 0.01 | 276 |
| | | 2(3) | 6 | 1 | 2.4 | 0.001 | 1148 |
| | | 3(3) | 3 | 16 | 3.9 | 0.01 | 229 |
| | | 4(3) | 1 | 1 | 3 | 0.01 | 86 |
| | | 5(3) | 6 | 20 | 3.8 | 0.01 | 364 |
| | | 6(3) | 6 | 12 | 3.4 | 0.01 | 235 |
| | | 7(3) | 2 | 21 | 4.6 | 0.01 | 458 |
| | | 8(3) | 2 | 11 | 3.4 | 0.01 | 263 |
| | | 9(3) | 4 | 10 | 3.4 | 0.01 | 226 |
| | | 10(2) | 3 | 15 | 3.8 | 0.01 | 283 |
| | | 11(2) | 2 | 12 | 3.8 | 0.01 | 257 |
| | | 12(2) | 2 | 15 | 4.2 | 0.01 | 243 |
| | | 13(2) | 2 | 14 | 4 | 0.01 | 205 |
| | | 14(1) | 1 | 15 | 4 | 0.01 | 388 |
| 4 | 0.1 | | | | 3.61 | 0.04 | 239 |
| | | 1(3) | 3 | 2 | 2.9 | 0.01 | 276 |
| | | 2(3) | 5 | 2 | 2.9 | 0.01 | 388 |
| | | 3(3) | 3 | 16 | 3.9 | 0.01 | 229 |
| | | 4(3) | 1 | 1 | 3 | 0.01 | 86 |
| | | 5(3) | 6 | 20 | 3.8 | 0.01 | 364 |
| | | 6(3) | 5 | 13 | 3.9 | 0.01 | 173 |
| | | 7(3) | 2 | 21 | 4.6 | 0.01 | 458 |

TABLE 18-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| | | 8(3) | 1 | 12 | 4.1 | 0.01 | 302 |
| | | 9(3) | 4 | 10 | 3.4 | 0.01 | 226 |
| | | 10(2) | 3 | 15 | 3.8 | 0.01 | 283 |
| | | 11(2) | 2 | 12 | 3.8 | 0.01 | 257 |
| | | 12(2) | 2 | 31 | 3 | 0.01 | 748 |
| | | 13(1) | 1 | 15 | 4 | 0.01 | 388 |
| 5 | 0.1 | | | | 3.7 | 0.05 | 122 |
| | | 1(3) | 3 | 2 | 2.9 | 0.01 | 276 |
| | | 2(3) | 4 | 3 | 2.8 | 0.01 | 243 |
| | | 3(3) | 3 | 16 | 3.9 | 0.01 | 229 |
| | | 4(3) | 1 | 1 | 3 | 0.01 | 86 |
| | | 5(3) | 5 | 20 | 4.1 | 0.01 | 245 |
| | | 6(3) | 5 | 14 | 4 | 0.01 | 178 |
| | | 7(3) | 2 | 21 | 4.6 | 0.01 | 458 |
| | | 8(3) | 4 | 23 | 4.3 | 0.01 | 315 |
| | | 9(2) | 2 | 15 | 4.2 | 0.01 | 243 |
| | | 10(2) | 2 | 13 | 4 | 0.01 | 216 |
| | | 11(2) | 2 | 31 | 3 | 0.01 | 748 |
| | | 12(1) | 1 | 15 | 4 | 0.01 | 388 |
| 6 | 0.1 | | | | 3.8 | 0.04 | 845 |
| | | 1(3) | 2 | 3 | 3.8 | 0.01 | 237 |
| | | 2(3) | 4 | 3 | 2.8 | 0.01 | 243 |
| | | 3(3) | 2 | 17 | 3.9 | 0.01 | 304 |
| | | 4(3) | 5 | 22 | 4.2 | 0.01 | 374 |
| | | 5(3) | 4 | 15 | 3.9 | 0.01 | 187 |
| | | 6(3) | 1 | 22 | 3.9 | 0.01 | 489 |
| | | 7(3) | 4 | 23 | 4.3 | 0.01 | 315 |
| | | 8(2) | 2 | 15 | 4.2 | 0.01 | 243 |
| | | 9(2) | 1 | 14 | 4 | 0.01 | 263 |
| | | 10(2) | 2 | 31 | 3 | 0.01 | 748 |
| | | 11(1) | 1 | 15 | 4 | 0.01 | 388 |
| 7 | 0.1 | | | | 3.8 | 0.09 | 192 |
| | | 1(3) | 1 | 4 | 3.6 | 0.01 | 256 |
| | | 2(3) | 4 | 3 | 2.8 | 0.01 | 243 |
| | | 3(3) | 2 | 17 | 3.9 | 0.01 | 304 |
| | | 4(3) | 4 | 22 | 4.4 | 0.01 | 555 |
| | | 5(3) | 4 | 16 | 4.3 | 0.01 | 232 |
| | | 6(3) | 4 | 46 | 4 | 0.01 | 2029 |
| | | 7(5) | 1 | 15 | 4 | 0.01 | 388 |
| | | 8(2) | 2 | 31 | 3 | 0.01 | 748 |
| 8 | 0.1 | | | | 3.63 | 0.05 | 263 |
| | | 1(3) | 1 | 4 | 3.6 | 0.01 | 256 |
| | | 2(3) | 3 | 4 | 3.4 | 0.01 | 206 |
| | | 3(3) | 2 | 17 | 3.9 | 0.01 | 304 |
| | | 4(3) | 4 | 22 | 4.4 | 0.01 | 555 |
| | | 5(3) | 3 | 17 | 4.1 | 0.01 | 313 |
| | | 6(3) | 3 | 47 | 2.2 | 0.01 | 6251 |
| | | 7(5) | 1 | 15 | 4 | 0.01 | 388 |
| | | 8(2) | 2 | 31 | 3 | 0.01 | 748 |
| 9 | 0.1 | | | | 3.2 | 0.1 | 172 |
| | | 1(3) | 1 | 4 | 3.6 | 0.01 | 256 |
| | | 2(3) | 2 | 5 | 3.2 | 0.01 | 229 |
| | | 3(3) | 2 | 17 | 3.9 | 0.01 | 304 |
| | | 4(3) | 3 | 22 | 3.8 | 0.01 | 351 |
| | | 5(3) | 3 | 18 | 3.2 | 0.01 | 296 |
| | | 6(3) | 2 | 48 | 2 | 0.01 | 6310 |
| | | 7(2) | 1 | 31 | 3.4 | 0.01 | 415 |
| | | 8(2) | 2 | 31 | 3 | 0.01 | 748 |
| 10 | 0.1 | | | | 3.3 | 0.11 | 398 |
| | | 1(3) | 1 | 4 | 3.6 | 0.01 | 256 |
| | | 2(3) | 1 | 6 | 3.4 | 0.01 | 231 |
| | | 3(3) | 2 | 17 | 3.9 | 0.01 | 304 |
| | | 4(3) | 3 | 22 | 3.8 | 0.01 | 351 |
| | | 5(3) | 2 | 19 | 3.9 | 0.01 | 346 |
| | | 6(3) | 1 | 49 | 2.2 | 0.01 | 6972 |
| | | 7(2) | 1 | 31 | 3.4 | 0.01 | 415 |
| | | 8(2) | 2 | 31 | 3 | 0.01 | 748 |

To solve this problem, the total number of epochs required for modelling binary sequences is 2786 and the number of epochs required in case of parallel execution is 845. While to solve the same problem using standard RNN with initial learning rate of 0.2 and error threshold (mean absolute deviation) of 0.01, the number of epochs required is 6714.

Prediction Values for the Fourth Target Sequence

Real prediction values for next 15 time steps for the fourth target sequence are set out below and these are same as expected values. Therefore, the results prove that the method proposed by embodiments of the invention is suitable for sequence prediction with long temporal dependency.

| 0.6 | 0.4 | 0.2 | 0 | 0 | 0 | 0 | 0 | 0 | 0 | 0 | 0 |
| 0 | 0.1 | 0.5 | | | | | | | | | |

Figure 8:
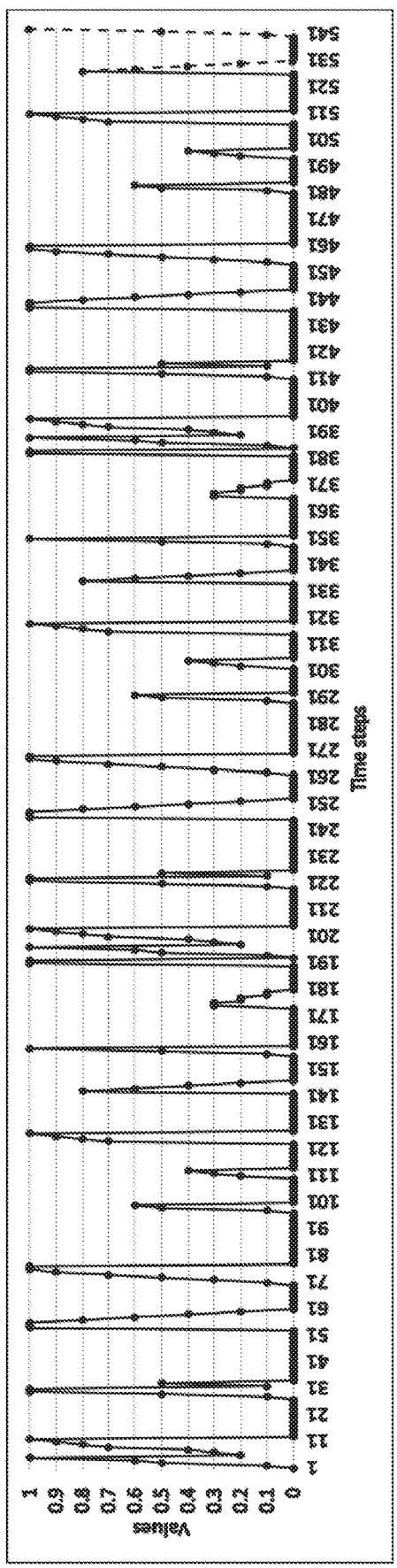
FIG. 8 is a line graph showing 15 real prediction values for a fourth target sequence alongside the fourth target sequence for visual comparison according to the test problem-2.

FIG. 8 is a line graph showing 15 real prediction values for the fourth target sequence alongside the fourth target sequence for visual comparison according to the test problem-2. As shown in FIG. 8, the prediction values for the next 15 time steps follow the pattern well.

Test Problem-3

A Fifth Target Sequence

| 0 | 0.5 | 1 | 0.1 | 0.6 | 0.3 | 0.8 | 0 | 0 | 0 | 0 |
|---|---|---|---|---|---|---|---|---|---|---|
| 0 | 0 | 0 | 0 | 0 | 0 | 0 | 0 | 0 | 0 | 0 |
| 0.8 | 0.7 | 0.6 | 0.5 | 0 | 0 | 0 | 0 | 0.4 | 0.3 | 0.2 |
| 0.1 | 0 | 0 | 0 | 0 | 1 | 0 | 1 | 0 | 1 | 0 |
| 0 | 0 | 0 | 0 | 0 | 0 | 0 | 0 | 0 | 1 | 1 |
| 1 | 0.1 | 0.2 | 0.3 | 0.4 | 0.5 | 0.4 | 0.3 | 0.2 | 0.1 | 0 |
| 0 | 0 | 0 | 0 | 0 | 0 | 0 | 0 | 0 | 0 | 0 |
| 0 | 0 | 0 | 0 | 0 | 0 | 0 | 0.9 | 0.7 | 0.5 |
| 0.3 | 0.1 | 0 | 0 | 0 | 0 | 0 | 0 | 0 | 0 | 0.8 |
| 0.6 | 0.4 | 0.2 | 0 | 1 | 0 | 0 | 0 | 0 | 0 | 0 |
| 0 | 0 | 0 | 0 | 1 | 1 | 1 | 1 | 1 | 0 | 0 |
| 0 | 0 | 0 | 0.2 | 0.2 | 0 | 0 | 0 | 0 | 0 | 0.4 |
| 0.4 | 0 | 0 | 0 | 0 | 0 | 0.6 | 0.6 | 0 | 0 | 0 |
| 0 | 0 | 0.8 | 0.8 | 0 | 0 | 0 | 0 | 0 | 1 | 1 |
| 0 | 0 | 0 | 0 | 0 | 0 | 0 | 0 | 0 | 0 | 0 |
| 0 | 0 | 0 | 0 | 0 | 0 | 0 | 0 | 0 | 1 | 0 |
| 0.5 | 1 | 0.1 | 0.6 | 0.3 | 0.8 | 0 | 0 | 0 | 0 | 0 |
| 0 | 0 | 0 | 0 | 0 | 0.1 | 0.2 | 0.3 | 0.4 | 0.5 | 0 |
| 0 | 0 | 0 | 0 | 0.6 | 0.7 | 0.8 | 0.9 | 1 | 0 | 0 |
| 0 | 0 | 0 | 0 | 0 | 0 | 0 | 0 | 1 | 1 | 1 |

-continued

| 0 | 0 | 0 | 0 | 1 | 1 | 1 | 1 | 0 | 0 | 0 |
|---|---|---|---|---|---|---|---|---|---|---|
| 0 | 0 | 1 | 0 | 0.5 | 1 | 0.1 | 0.6 | 0.3 | 0.8 | 0 |
| 0 | 0 | 0 | 0 | 0 | 0 | 0 | 0 | 0 | 0 | 0 |
| 0 | 0 | 0 | 0.8 | 0.7 | 0.6 | 0.5 | 0 | 0 | 0 | 0 |
| 0.4 | 0.3 | 0.2 | 0.1 | 0 | 0 | 0 | 0 | 1 | 0 | 1 |
| 0 | 1 | 0 | 0 | 0 | 0 | 0 | 0 | 0 | 0 | 0 |
| 0 | 1 | 1 | 1 | 0.1 | 0.2 | 0.3 | 0.4 | 0.5 | 0.4 | 0.3 |
| 0.2 | 0.1 | 0 | 0 | 0 | 0 | 0 | 0 | 0 | 0 | 0 |
| 0 | 0 | 0 | 0 | 0 | 0 | 0 | 0 | 0 | 0 | 0 |
| 0.9 | 0.7 | 0.5 | 0.3 | 0.1 | 0 | 0 | 0 | 0 | 0 | 0 |
| 0 | 0 | 0.8 | 0.6 | 0.4 | 0.2 | 0 | 1 | 0 | 0 | 0 |
| 0 | 0 | 0 | 0 | 0 | 0 | 0 | 1 | 1 | 1 | 1 |
| 1 | 0 | 0 | 0 | 0 | 0 | 0.2 | 0.2 | 0 | 0 | 0 |
| 0 | 0 | 0.4 | 0.4 | 0 | 0 | 0 | 0 | 0 | 0.6 | 0.6 |
| 0 | 0 | 0 | 0 | 0 | 0.8 | 0.8 | 0 | 0 | 0 | 0 |
| 0 | 1 | 1 | 0 | 0 | 0 | 0 | 0 | 0 | 0 | 0 |
| 0 | 0 | 0 | 0 | 0 | 0 | 0 | 0 | 0 | 0 | 0 |
| 0 | 1 | 0 | 0.5 | 1 | 0.1 | 0.6 | 0.3 | 0.8 | 0 | 0 |
| 0 | 0 | 0 | 0 | 0 | 0 | 0 | 0.1 | 0.2 | 0.3 |
| 0.4 | 0.5 | 0 | 0 | 0 | 0 | 0 | 0.6 | 0.7 | 0.8 | 0.9 |
| 1 | 0 | 0 | 0 | 0 | 0 | 0 | 0 | 0 | 0 | 0 |
| 1 | 1 | 1 | 0 | 0 | 0 | 0 | 1 | 1 | 1 | 1 |
| 0 | 0 | 0 | 0 | 0 | 1 | 0 | 0.5 | 1 | 0.1 | 0.6 |
| 0.3 | 0.8 | 0 | 0 | 0 | 0 | 0 | 0 | 0 | 0 | 0 |
| 0 | 0 | 0 | 0 | 0 | 0 | 0.8 | 0.7 | 0.6 | 0.5 | 0 |
| 0 | 0 | 0 | 0.4 | 0.3 | 0.2 | 0.1 | 0 | 0 | 0 | 0 |
| 1 | 0 | 1 | 0 | 1 | 0 | 0 | 0 | 0 | 0 | 0 |
| 0 | 0 | 0 | 0 | 1 | 1 | 1 | 0.1 | 0.2 | 0.3 | 0.4 |
| 0.5 | 0.4 | 0.3 | 0.2 | 0.1 | 0 | 0 | 0 | 0 | 0 | 0 |
| 0 | 0 | 0 | 0 | 0 | 0 | 0 | 0 | 0 | 0 | 0 |
| 0 | 0 | 0 | 0.9 | 0.7 | 0.5 | 0.3 | 0.1 | 0 | 0 | 0 |
| 0 | 0 | 0 | 0 | 0 | 0.8 | 0.6 | 0.4 | 0.2 | 0 | 1 |
| 0 | 0 | 0 | 0 | 0 | 0 | 0 | 0 | 0 | 0 | 1 |
| 1 | 1 | 1 | 1 | 0 | 0 | 0 | 0 | 0 | 0.2 | 0.2 |
| 0 | 0 | 0 | 0 | 0 | 0.4 | 0.4 | 0 | 0 | 0 |
| 0 | 0.6 | 0.6 | 0 | 0 | 0 | 0 | 0 | 0.8 | 0.8 | 0 |
| 0 | 0 | 0 | 0 | 1 | 1 | 0 | 0 | 0 | 0 | 0 |
| 0 | 0 | 0 | 0 | 0 | 0 | 0 | 0 | 0 | 0 | 0 |
| 0 | 0 | 0 | 0 | | | | | | | |

Computations

Details of binary and elementary sequences modelling are set out in Table 19 below. There are 10 binary sequences in the binary sequence group generated based on the fifth target sequence. The 10 binary sequences are not shown in this document as the sizes of the sequences are too big. Similarly, elementary sequences are just mentioned below but actual sequences are not included due to length.

TABLE 19

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| 1 | 0.1 | | | | 3.3 | 0.03 | 648 |
| | | 1(5) | 6 | 1 | 2.4 | 0.001 | 1148 |
| | | 2(3) | 4 | 15 | 3.9 | 0.01 | 187 |
| | | 3(5) | 4 | 4 | 2.8 | 0.01 | 144 |
| | | 4(3) | 1 | 4 | 3.6 | 0.01 | 256 |
| | | 5(9) | 1 | 1 | 3 | 0.01 | 86 |
| | | 6(3) | 12 | 10 | 3.4 | 0.01 | 171 |
| | | 7(3) | 5 | 20 | 4.1 | 0.01 | 245 |
| | | 8(3) | 4 | 8 | 4 | 0.01 | 207 |
| | | 9(5) | 5 | 10 | 3 | 0.01 | 186 |
| | | 10(15) | 2 | 5 | 3.2 | 0.01 | 229 |
| | | 11(2) | 1 | 20 | 4.5 | 0.01 | 409 |
| | | 12(2) | 5 | 5 | 3.2 | 0.01 | 142 |
| | | 13(2) | 3 | 10 | 4.1 | 0.01 | 216 |
| | | 14(2) | 1 | 5 | 3.4 | 0.01 | 247 |
| 2 | 0.1 | | | | 3.3 | 0.02 | 113 |
| | | 1(5) | 2 | 1 | 3.2 | 0.005 | 547 |
| | | 2(5) | 3 | 1 | 2.8 | 0.001 | 1078 |

TABLE 19-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| | | 3(3) | 4 | 15 | 3.9 | 0.01 | 187 |
| | | 4(3) | 3 | 4 | 3.4 | 0.01 | 206 |
| | | 5(5) | 1 | 5 | 3.4 | 0.01 | 247 |
| | | 6(9) | 1 | 1 | 3 | 0.01 | 86 |
| | | 7(5) | 3 | 10 | 4.1 | 0.01 | 216 |
| | | 8(3) | 7 | 1 | 2.5 | 0.001 | 1079 |
| | | 9(3) | 4 | 21 | 4.1 | 0.01 | 281 |
| | | 10(3) | 4 | 9 | 3.9 | 0.01 | 148 |
| | | 11(3) | 5 | 10 | 3 | 0.01 | 186 |
| | | 12(15) | 2 | 5 | 3.2 | 0.01 | 229 |
| | | 13(2) | 1 | 20 | 4.5 | 0.01 | 409 |
| | | 14(2) | 4 | 11 | 3.7 | 0.01 | 200 |
| | | 15(2) | 5 | 5 | 3.2 | 0.01 | 142 |
| | | 16(2) | 4 | 4 | 2.8 | 0.01 | 144 |
| | | 17(2) | 1 | 5 | 3.4 | 0.01 | 247 |
| 3 | 0.1 | | | | 3.4 | 0.03 | 404 |
| | | 1(5) | 2 | 1 | 3.2 | 0.005 | 547 |
| | | 2(5) | 3 | 1 | 2.8 | 0.001 | 1078 |
| | | 3(3) | 4 | 15 | 3.9 | 0.01 | 187 |
| | | 4(3) | 2 | 4 | 4 | 0.01 | 211 |
| | | 5(3) | 1 | 6 | 3.4 | 0.01 | 231 |
| | | 6(6) | 1 | 1 | 3 | 0.01 | 86 |
| | | 7(5) | 3 | 10 | 4.1 | 0.01 | 216 |
| | | 8(3) | 5 | 2 | 2.9 | 0.01 | 388 |
| | | 9(3) | 4 | 22 | 4.4 | 0.01 | 555 |
| | | 10(3) | 3 | 9 | 3.9 | 0.01 | 169 |
| | | 11(3) | 1 | 2 | 3.2 | 0.01 | 295 |
| | | 12(3) | 5 | 10 | 3 | 0.01 | 186 |
| | | 13(3) | 2 | 12 | 3.8 | 0.01 | 257 |
| | | 14(9) | 2 | 5 | 3.2 | 0.01 | 229 |
| | | 15(2) | 1 | 20 | 4.5 | 0.01 | 409 |
| | | 16(2) | 3 | 12 | 4 | 0.01 | 185 |
| | | 17(2) | 5 | 5 | 2.9 | 0.01 | 142 |
| | | 18(2) | 4 | 4 | 2.8 | 0.01 | 144 |
| | | 19(2) | 1 | 5 | 3.4 | 0.01 | 247 |
| 4 | 0.1 | | | | 3.42 | 0.03 | 1268 |
| | | 1(5) | 2 | 1 | 3.2 | 0.005 | 547 |
| | | 2(16) | 1 | 1 | 3 | 0.01 | 86 |
| | | 3(3) | 4 | 15 | 3.9 | 0.01 | 187 |
| | | 4(3) | 1 | 4 | 3.6 | 0.01 | 256 |
| | | 5(3) | 1 | 7 | 3.4 | 0.01 | 278 |
| | | 6(8) | 3 | 10 | 4.1 | 0.01 | 216 |
| | | 7(3) | 3 | 3 | 3.4 | 0.01 | 238 |
| | | 8(3) | 3 | 23 | 4 | 0.01 | 285 |
| | | 9(3) | 1 | 2 | 3.2 | 0.01 | 295 |
| | | 10(3) | 5 | 10 | 3 | 0.01 | 186 |
| | | 11(3) | 2 | 12 | 3.8 | 0.01 | 257 |
| | | 12(9) | 2 | 5 | 3.2 | 0.01 | 229 |
| | | 13(2) | 1 | 20 | 4.5 | 0.01 | 409 |
| | | 14(2) | 2 | 13 | 4 | 0.01 | 216 |
| | | 15(2) | 5 | 5 | 3.2 | 0.01 | 142 |
| | | 16(2) | 4 | 4 | 2.8 | 0.01 | 144 |
| | | 17(2) | 1 | 5 | 3.4 | 0.01 | 247 |
| 5 | 0.1 | | | | 3.51 | 0.03 | 114 |
| | | 1(5) | 2 | 1 | 3.2 | 0.005 | 547 |
| | | 2(16) | 1 | 1 | 3 | 0.01 | 86 |
| | | 3(3) | 4 | 15 | 3.9 | 0.01 | 187 |
| | | 4(3) | 1 | 12 | 4.1 | 0.01 | 302 |
| | | 5(5) | 3 | 10 | 4.1 | 0.01 | 216 |
| | | 6(3) | 1 | 4 | 3.6 | 0.01 | 256 |
| | | 7(3) | 3 | 24 | 4.3 | 0.01 | 495 |
| | | 8(3) | 2 | 10 | 3.5 | 0.01 | 236 |
| | | 9(3) | 1 | 3 | 3.9 | 0.01 | 311 |
| | | 10(3) | 5 | 10 | 3 | 0.01 | 186 |
| | | 11(3) | 2 | 19 | 3.9 | 0.01 | 346 |
| | | 12(6) | 2 | 5 | 3.2 | 0.01 | 229 |
| | | 13(2) | 1 | 20 | 4.5 | 0.01 | 409 |
| | | 14(2) | 1 | 14 | 4 | 0.01 | 263 |
| | | 15(2) | 5 | 5 | 3.2 | 0.01 | 142 |
| | | 16(2) | 4 | 4 | 2.8 | 0.01 | 144 |
| | | 17(2) | 1 | 5 | 3.4 | 0.01 | 247 |
| 6 | 0.1 | | | | 3.45 | 0.04 | 306 |
| | | 1(5) | 1 | 2 | 3.2 | 0.01 | 295 |

TABLE 19-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| | | 2(16) | 1 | 1 | 3 | 0.01 | 86 |
| | | 3(3) | 3 | 15 | 3.8 | 0.01 | 283 |
| | | 4(3) | 1 | 13 | 4.3 | 0.01 | 352 |
| | | 5(5) | 3 | 10 | 4.1 | 0.01 | 216 |
| | | 6(3) | 2 | 29 | 3.8 | 0.01 | 723 |
| | | 7(3) | 2 | 11 | 3.4 | 0.01 | 263 |
| | | 8(3) | 1 | 3 | 3.9 | 0.01 | 311 |
| | | 9(3) | 5 | 10 | 3 | 0.01 | 186 |
| | | 10(3) | 2 | 19 | 3.9 | 0.01 | 346 |
| | | 11(6) | 2 | 5 | 3.2 | 0.01 | 229 |
| | | 12(2) | 1 | 20 | 4.5 | 0.01 | 409 |
| | | 13(2) | 5 | 20 | 4.1 | 0.01 | 245 |
| | | 14(2) | 4 | 4 | 2.8 | 0.01 | 144 |
| | | 15(2) | 1 | 5 | 3.4 | 0.01 | 247 |
| 7 | | | | | 3.58 | 0.05 | 245 |
| | | 1(5) | 1 | 2 | 3.2 | 0.01 | 295 |
| | | 2(5) | 1 | 3 | 3.9 | 0.01 | 311 |
| | | 3(3) | 2 | 15 | 4.2 | 0.01 | 243 |
| | | 4(3) | 1 | 14 | 4 | 0.01 | 263 |
| | | 5(6) | 1 | 1 | 3 | 0.01 | 86 |
| | | 6(5) | 3 | 10 | 4.1 | 0.01 | 216 |
| | | 7(3) | 2 | 29 | 3.8 | 0.01 | 723 |
| | | 8(3) | 1 | 11 | 3.5 | 0.01 | 329 |
| | | 9(3) | 1 | 4 | 3.6 | 0.01 | 256 |
| | | 10(3) | 5 | 10 | 3 | 0.01 | 186 |
| | | 11(3) | 2 | 26 | 3.4 | 0.01 | 575 |
| | | 12(3) | 2 | 5 | 3.2 | 0.01 | 229 |
| | | 13(2) | 1 | 20 | 4.5 | 0.01 | 409 |
| | | 14(2) | 4 | 21 | 4.1 | 0.01 | 300 |
| | | 15(2) | 4 | 4 | 2.8 | 0.01 | 144 |
| | | 16(2) | 1 | 5 | 3.4 | 0.01 | 247 |
| 8 | 0.1 | | | | 3.52 | 0.05 | 453 |
| | | 1(5) | 1 | 2 | 3.2 | 0.01 | 295 |
| | | 2(5) | 1 | 3 | 3.9 | 0.01 | 311 |
| | | 3(6) | 1 | 15 | 4 | 0.01 | 388 |
| | | 4(6) | 1 | 1 | 3 | 0.01 | 86 |
| | | 5(5) | 3 | 10 | 4.1 | 0.01 | 216 |
| | | 6(3) | 1 | 29 | 3.1 | 0.01 | 447 |
| | | 7(3) | 1 | 12 | 4.1 | 0.01 | 302 |
| | | 8(3) | 1 | 4 | 3.6 | 0.01 | 256 |
| | | 9(3) | 5 | 10 | 3 | 0.01 | 186 |
| | | 10(3) | 2 | 26 | 3.4 | 0.01 | 575 |
| | | 11(3) | 2 | 5 | 3.2 | 0.01 | 229 |
| | | 12(2) | 1 | 20 | 4.5 | 0.01 | 409 |
| | | 13(2) | 3 | 22 | 3.8 | 0.01 | 351 |
| | | 14(2) | 4 | 4 | 2.8 | 0.01 | 144 |
| | | 15(2) | 1 | 5 | 3.4 | 0.01 | 247 |
| 9 | 0.1 | | | | 3.53 | 0.08 | 712 |
| | | 1(5) | 1 | 2 | 3.2 | 0.01 | 295 |
| | | 2(3) | 1 | 35 | 3 | 0.01 | 481 |
| | | 3(6) | 1 | 1 | 3 | 0.01 | 86 |
| | | 4(5) | 3 | 10 | 4.1 | 0.01 | 216 |
| | | 5(3) | 1 | 29 | 3.1 | 0.01 | 447 |
| | | 6(3) | 1 | 17 | 4.3 | 0.01 | 375 |
| | | 7(3) | 5 | 10 | 3 | 0.01 | 186 |
| | | 8(3) | 2 | 33 | 3.5 | 0.01 | 1740 |
| | | 9(2) | 1 | 20 | 4.5 | 0.01 | 409 |
| | | 10(2) | 2 | 27 | 5.1 | 0.01 | 701 |
| | | 11(2) | 4 | 4 | 2.8 | 0.01 | 144 |
| | | 12(2) | 1 | 5 | 3.4 | 0.01 | 247 |
| 10 | 0.1 | | | | 3.38 | 0.1 | 262 |
| | | 1(5) | 1 | 2 | 3.2 | 0.01 | 295 |
| | | 2(3) | 1 | 35 | 3 | 0.01 | 481 |
| | | 3(6) | 1 | 1 | 3 | 0.01 | 86 |
| | | 4(5) | 3 | 10 | 4.1 | 0.01 | 216 |
| | | 5(3) | 1 | 47 | 3.4 | 0.01 | 2125 |
| | | 6(3) | 5 | 10 | 3 | 0.01 | 186 |
| | | 7(3) | 2 | 33 | 3.5 | 0.01 | 1740 |
| | | 8(2) | 1 | 20 | 4.5 | 0.01 | 409 |
| | | 9(2) | 1 | 28 | 3.6 | 0.01 | 479 |
| | | 10(2) | 4 | 4 | 2.8 | 0.01 | 144 |
| | | 11(2) | 1 | 5 | 3.4 | 0.01 | 247 |

To solve this problem, the total number of epochs required for modelling binary sequences is 4525 and the number of epochs required in case of parallel execution is 1268. While, to solve the same problem using standard RNN with initial learning rate of 0.1 and error threshold (mean absolute deviation) of 0.01, the number of epochs required is 9138.

Prediction Values for the Fifth Target Sequence

Real prediction values for next 23 time steps for the fifth target sequence are set out below and these are same as expected values. Therefore, the results prove that the method proposed by embodiments of the invention is suitable for sequence prediction with long temporal dependency.

| 1 | 0 | 0.5 | 1 | 0.1 | 0.6 | 0.3 | 0.8 | 0 | 0 | 0 | 0 |
|---|---|---|---|---|---|---|---|---|---|---|---|
| 0 | 0 | 0 | 0 | 0 | 0 | 0.1 | 0.2 | 0.3 | 0.4 | 0.5 | |

Figure 9:
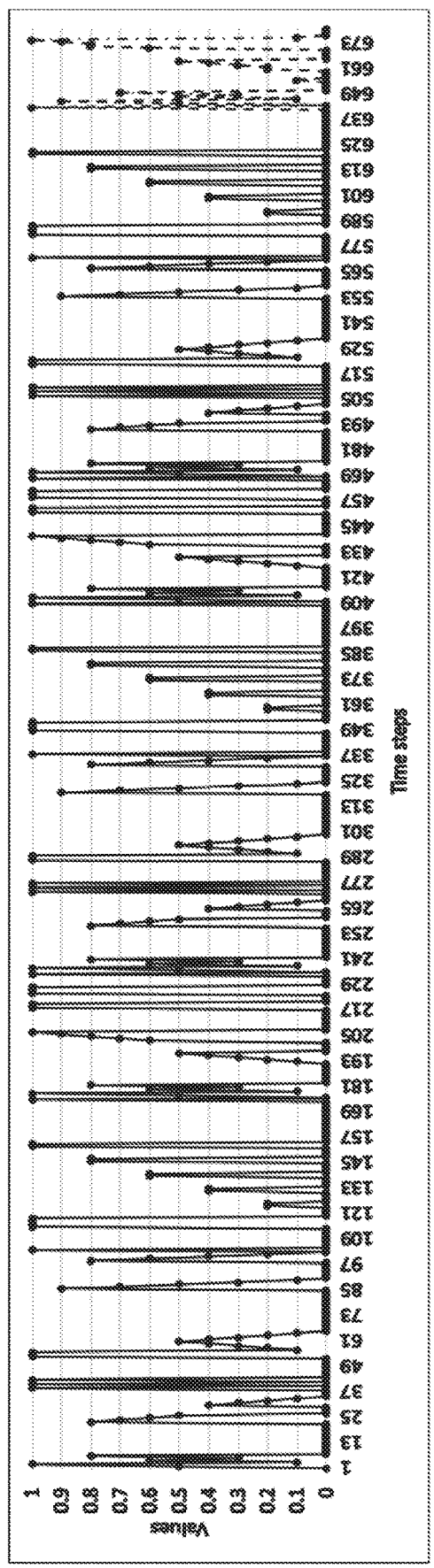
FIG. 9 is a line graph showing 23 real prediction values for a fifth target sequence alongside the fifth target sequence for visual comparison according to the test problem-3.

FIG. 9 is a line graph showing 23 real prediction values for the fifth target sequence alongside the fifth target sequence for visual comparison according to the test problem-3. As shown in FIG. 9, the prediction values for the next 23 time steps follow the pattern well.

Test Problem-4

Unlike the test problems 1-3, a sixth target sequence associated with this test problem is not perfectly repeating and is used to test generalization capability of the proposed method.

A Sixth Target Sequence

| 0 | 0.5 | 1 | 0.1 | 0.6 | 0.3 | 0.8 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0.8 | 0.7 |
| 0.6 | 0.5 | 0 | 0 | 0 | 0 | 0.4 | 0.3 | 0.2 | 0.1 | 0 | 0 |
| 0 | 0 | 1 | 0 | 1 | 0 | 1 | 0 | 0 | 0 | 0 | 0 |
| 0 | 0 | 0 | 0 | 0 | 1 | 1 | 1 | 0.1 | 0.2 | 0.3 | 0.4 |
| 0.5 | 0.4 | 0.3 | 0.2 | 0.1 | 0 | 0 | 0 | 0 | 0 | 0 | 0 |
| 0 | 0 | 0 | 0 | 0 | 0 | 0 | 0 | 0 | 0 | 0 | 0 |
| 0 | 0.9 | 0.7 | 0.5 | 0.3 | 0.1 | 0 | 0 | 0 | 0 | 0 | 0 |
| 0 | 0 | 0.8 | 0.6 | 0.4 | 0.2 | 0 | 1 | 0 | 0 | 0 | 0 |
| 0 | 0 | 0 | 0 | 0 | 0 | 0 | 0 | 0 | 0 | 0 | 0 |
| 0 | 0 | 0 | 0 | 0.2 | 0.2 | 0 | 0 | 0 | 0 | 0 | 0.4 |
| 0.4 | 0 | 0 | 0 | 0 | 0.6 | 0.6 | 0 | 0 | 0 | 0 | 0 |
| 0 | 0.8 | 0.8 | 0 | 0 | 0 | 0 | 0 | 0.1 | 0.1 | 0 | 0 |
| 0 | 0 | 0 | 0 | 0 | 0 | 0 | 0 | 0 | 0 | 0 | 0 |
| 0 | 0 | 0 | 0 | 0 | 0 | 1 | 0 | 0.5 | 1 | 0.1 | 0.3 |
| 0.5 | 0.7 | 0 | 0 | 0 | 0 | 0 | 0 | 0 | 0 | 0 | 0 |
| 0.1 | 0.2 | 0.3 | 0.4 | 0 | 0 | 0 | 0 | 0 | 0 | 0.6 | 0.7 |
| 0.8 | 0.9 | 1 | 0 | 0 | 0 | 0 | 0 | 0 | 0 | 0 | 0 |
| 0 | 1 | 1 | 1 | 0 | 0 | 0 | 0 | 1 | 1 | 1 | 1 |
| 0 | 0.5 | 1 | 0.1 | 0.6 | 0.3 | 0.8 | 0 | 0 | 0 | 0 | 0 |
| 0 | 0 | 0 | 0 | 0 | 0 | 0 | 0 | 0 | 0 | 0.8 | 0.7 |
| 0.6 | 0.5 | 0 | 0 | 0 | 0 | 0.4 | 0.3 | 0.2 | 0.1 | 0 | 0 |
| 0 | 0 | 0.8 | 0 | 0.8 | 0 | 0.8 | 0 | 0 | 0 | 0 | 0 |
| 0 | 0 | 0 | 0 | 0 | 1 | 1 | 1 | 0.1 | 0.2 | 0.3 | 0.4 |
| 0.5 | 0.4 | 0.3 | 0.2 | 0.1 | 0 | 0 | 0 | 0 | 0 | 0 | 0 |
| 0 | 0 | 0 | 0 | 0 | 0 | 0 | 0 | 0 | 0 | 0 | 0 |
| 0 | 0.9 | 0.7 | 0.5 | 0.3 | 0.1 | 0 | 0 | 0 | 0 | 0 | 0 |
| 0 | 0 | 0.7 | 0.5 | 0.3 | 0.1 | 0 | 1 | 0 | 0 | 0 | 0 |
| 0 | 0 | 0 | 0 | 0 | 0 | 0 | 0 | 0 | 0 | 0 | 0.4 |
| 0.4 | 0 | 0 | 0 | 0 | 0 | 0.5 | 0.5 | 0 | 0 | 0 | 0 |
| 0 | 0.8 | 0.8 | 0 | 0 | 0 | 0 | 0 | 0.1 | 0.1 | 0 | 0 |
| 0 | 0 | 0 | 0 | 0 | 0 | 0 | 0 | 0 | 0 | 0 | 0 |
| 0 | 0 | 0 | 0 | 0 | 0 | 1 | 0 | 0.5 | 1 | 0.1 | 0.2 |
| 0.4 | 0 | 0 | 0 | 0 | 0 | 0 | 0 | 0 | 0 | 0 | 0 |
| 0.1 | 0.2 | 0.3 | 0.4 | 0 | 0 | 0 | 0 | 0 | 0 | 0.4 | 0.5 |
| 0.6 | 0.7 | 0.8 | 0 | 0 | 0 | 0 | 0 | 0 | 0 | 0 | 0 |
| 0 | 1 | 1 | 1 | 0 | 0 | 0 | 0 | 1 | 1 | 1 | 1 |
| 0 | 0.5 | 1 | 0.1 | 0.6 | 0.3 | 0.8 | 0 | 0 | 0 | 0 | 0 |
| 0 | 0 | 0 | 0 | 0 | 0 | 0 | 0 | 0 | 0 | 0.8 | 0.7 |
| 0.6 | 0.5 | 0 | 0 | 0 | 0 | 0.4 | 0.3 | 0.2 | 0.1 | 0 | 0 |
| 0 | 0 | 1 | 0 | 1 | 0 | 1 | 0 | 0 | 0 | 0 | 0 |
| 0 | 0 | 0 | 0 | 0 | 1 | 1 | 1 | 0.1 | 0.2 | 0.3 | 0.4 |
| 0.5 | 0.4 | 0.3 | 0.2 | 0.1 | 0 | 0 | 0 | 0 | 0 | 0 | 0 |
| 0 | 0 | 0 | 0 | 0 | 0 | 0 | 0 | 0 | 0 | 0 | 0 |
| 0 | 0.9 | 0.7 | 0.5 | 0.3 | 0.1 | 0 | 0 | 0 | 0 | 0 | 0 |
| 0 | 0 | 0.8 | 0.6 | 0.4 | 0.2 | 0 | 1 | 0 | 0 | 0 | 0 |
| 0 | 0 | 0 | 0 | 0 | 0 | 0 | 0 | 0 | 0 | 0 | 0 |
| 0 | 0 | 0 | 0 | 0.2 | 0.2 | 0 | 0 | 0 | 0 | 0 | 0.4 |
| 0.4 | 0 | 0 | 0 | 0 | 0 | 0.6 | 0.6 | 0 | 0 | 0 | 0 |
| 0 | 0.8 | 0.8 | 0 | 0 | 0 | 0 | 0 | 0.1 | 0.1 | 0 | 0 |
| 0 | 0 | 0 | 0 | 0 | 0 | 0 | 0 | 0 | 0 | 0 | 0 |
| 0 | 0 | 0 | 0 | 0 | 0 | 1 | 0 | | | | |

Computations

Details of binary and elementary sequences modelling are set out in Table 20 below. There are 10 binary sequences in the binary sequence group generated based on the sixth target sequence. The 10 binary sequences are not shown in this document as the sizes of the sequences are too big. Similarly, elementary sequences are just mentioned below but actual sequences are not included due to length.

TABLE 20

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| 1 | 0.1 | | | | 3.39 | 0.03 | 411 |
| | | 1(4) | 6 | 1 | 2.4 | 0.001 | 1148 |
| | | 2(3) | 4 | 15 | 3.9 | 0.01 | 187 |
| | | 3(5) | 4 | 4 | 2.8 | 0.01 | 144 |
| | | 4(3) | 1 | 4 | 3.6 | 0.01 | 256 |
| | | 5(9) | 1 | 1 | 3 | 0.01 | 86 |
| | | 6(3) | 12 | 10 | 3.4 | 0.01 | 171 |
| | | 7(3) | 5 | 20 | 4.1 | 0.01 | 245 |
| | | 8(3) | 4 | 8 | 4 | 0.01 | 207 |
| | | 9(2) | 2 | 20 | 4.4 | 0.01 | 247 |
| | | 10(11) | 2 | 5 | 3.2 | 0.01 | 229 |
| | | 11(3) | 1 | 20 | 4.5 | 0.01 | 409 |
| | | 12(1) | 5 | 1 | 2.3 | 0.001 | 1033 |
| | | 13(1) | 4 | 10 | 3.4 | 0.01 | 226 |
| | | 14(1) | 4 | 11 | 3.7 | 0.01 | 200 |
| | | 15(2) | 5 | 6 | 3.8 | 0.01 | 219 |
| | | 16(2) | 3 | 10 | 4.1 | 0.01 | 216 |
| | | 17(1) | 2 | 27 | 5.1 | 0.01 | 701 |
| 2 | 0.1 | | | | 3.51 | 0.04 | 212 |

TABLE 20-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| | | 1(6) | 2 | 1 | 3.2 | 0.005 | 547 |
| | | 2(4) | 3 | 1 | 2.8 | 0.001 | 1078 |
| | | 3(3) | 4 | 15 | 3.9 | 0.01 | 187 |
| | | 4(3) | 3 | 4 | 3.4 | 0.01 | 206 |
| | | 5(3) | 1 | 5 | 3.4 | 0.01 | 247 |
| | | 6(8) | 1 | 1 | 3 | 0.01 | 86 |
| | | 7(5) | 3 | 10 | 4.1 | 0.01 | 216 |
| | | 8(3) | 7 | 1 | 2.5 | 0.001 | 1079 |
| | | 9(3) | 4 | 21 | 4.1 | 0.01 | 300 |
| | | 10(2) | 4 | 9 | 3.9 | 0.01 | 148 |
| | | 11(1) | 3 | 9 | 3.9 | 0.01 | 169 |
| | | 12(1) | 1 | 2 | 3.2 | 0.01 | 295 |
| | | 13(2) | 2 | 20 | 4.4 | 0.01 | 247 |
| | | 14(1) | 2 | 27 | 5.1 | 0.01 | 701 |
| | | 15(8) | 2 | 5 | 3.2 | 0.01 | 229 |
| | | 16(3) | 1 | 27 | 5.1 | 0.01 | 577 |
| | | 17(1) | 3 | 11 | 4 | 0.01 | 250 |
| | | 18(1) | 3 | 12 | 4 | 0.01 | 185 |
| | | 19(2) | 5 | 6 | 3.8 | 0.01 | 219 |
| | | 20(2) | 4 | 4 | 2.8 | 0.01 | 144 |
| 3 | 0.1 | | | | 3.6 | 0.04 | 114 |
| | | 1(5) | 2 | 1 | 3.2 | 0.005 | 547 |
| | | 2(4) | 3 | 1 | 2.8 | 0.001 | 1078 |
| | | 3(3) | 4 | 15 | 3.9 | 0.01 | 187 |
| | | 4(3) | 2 | 4 | 4 | 0.01 | 211 |
| | | 5(3) | 1 | 6 | 3.4 | 0.01 | 231 |
| | | 6(6) | 1 | 1 | 3 | 0.01 | 86 |
| | | 7(5) | 3 | 10 | 4.1 | 0.01 | 216 |
| | | 8(3) | 5 | 2 | 2.9 | 0.01 | 388 |
| | | 9(3) | 4 | 22 | 4.4 | 0.01 | 555 |
| | | 10(3) | 3 | 9 | 3.9 | 0.01 | 169 |
| | | 11(4) | 1 | 2 | 3.2 | 0.01 | 295 |
| | | 12(3) | 2 | 27 | 5.1 | 0.01 | 701 |
| | | 13(6) | 2 | 5 | 3.2 | 0.01 | 229 |
| | | 14(3) | 1 | 27 | 5.1 | 0.01 | 577 |
| | | 15(1) | 2 | 12 | 3.8 | 0.01 | 257 |
| | | 16(1) | 2 | 13 | 4 | 0.01 | 216 |
| | | 17(2) | 5 | 6 | 3.8 | 0.01 | 219 |
| | | 18(2) | 4 | 4 | 2.8 | 0.01 | 144 |
| 4 | 0.1 | | | | 3.61 | 0.046 | 445 |
| | | 1(5) | 2 | 1 | 3.2 | 0.005 | 547 |
| | | 2(12) | 1 | 1 | 3 | 0.01 | 86 |
| | | 3(3) | 4 | 15 | 3.9 | 0.01 | 187 |
| | | 4(3) | 1 | 4 | 3.6 | 0.01 | 256 |
| | | 5(3) | 1 | 7 | 3.4 | 0.01 | 278 |
| | | 6(7) | 3 | 10 | 4.1 | 0.01 | 216 |
| | | 7(5) | 3 | 3 | 3.4 | 0.01 | 238 |
| | | 8(3) | 3 | 23 | 4 | 0.01 | 285 |
| | | 9(1) | 2 | 10 | 3.5 | 0.01 | 236 |
| | | 10(3) | 1 | 2 | 3.2 | 0.01 | 295 |
| | | 11(1) | 1 | 3 | 3.9 | 0.01 | 311 |
| | | 12(3) | 2 | 27 | 5.1 | 0.01 | 701 |
| | | 13(6) | 2 | 5 | 3.2 | 0.01 | 229 |
| | | 14(3) | 1 | 27 | 5.1 | 0.01 | 577 |
| | | 15(1) | 2 | 2 | 2.8 | 0.01 | 247 |
| | | 16(1) | 1 | 13 | 4.3 | 0.01 | 352 |
| | | 17(1) | 1 | 14 | 4 | 0.01 | 263 |
| | | 18(2) | 5 | 6 | 3.8 | 0.01 | 219 |
| | | 19(2) | 4 | 4 | 2.8 | 0.01 | 144 |
| 5 | 0.1 | | | | 3.6 | 0.06 | 81 |
| | | 1(5) | 2 | 1 | 3.2 | 0.005 | 547 |
| | | 2(12) | 1 | 1 | 3 | 0.01 | 86 |
| | | 3(3) | 4 | 15 | 3.9 | 0.01 | 187 |
| | | 4(3) | 1 | 12 | 4.1 | 0.01 | 302 |
| | | 5(5) | 3 | 10 | 4.1 | 0.01 | 216 |
| | | 6(3) | 1 | 4 | 3.6 | 0.01 | 256 |
| | | 7(3) | 3 | 24 | 4.3 | 0.01 | 495 |
| | | 8(3) | 2 | 10 | 3.5 | 0.01 | 236 |
| | | 9(3) | 1 | 3 | 3.9 | 0.01 | 311 |
| | | 10(3) | 2 | 34 | 3.7 | 0.01 | 3236 |
| | | 11(3) | 2 | 5 | 3.2 | 0.01 | 229 |
| | | 12(3) | 1 | 27 | 5.1 | 0.01 | 577 |
| | | 13(1) | 2 | 2 | 2.8 | 0.01 | 247 |

TABLE 20-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| | | 14(1) | 5 | 20 | 4.1 | 0.01 | 245 |
| | | 15(1) | 4 | 25 | 4.1 | 0.01 | 596 |
| | | 16(2) | 4 | 4 | 2.8 | 0.01 | 144 |
| 6 | 0.1 | | | | 3.6 | 0.07 | 279 |
| | | 1(5) | 1 | 2 | 3.2 | 0.01 | 295 |
| | | 2(12) | 1 | 1 | 3 | 0.01 | 86 |
| | | 3(3) | 3 | 15 | 3.8 | 0.01 | 283 |
| | | 4(3) | 1 | 13 | 4.3 | 0.01 | 352 |
| | | 5(5) | 3 | 10 | 4.1 | 0.01 | 216 |
| | | 6(3) | 2 | 29 | 3.8 | 0.01 | 723 |
| | | 7(2) | 2 | 11 | 3.4 | 0.01 | 263 |
| | | 8(1) | 1 | 11 | 3.5 | 0.01 | 329 |
| | | 9(3) | 1 | 3 | 3.9 | 0.01 | 311 |
| | | 10(1) | 1 | 4 | 3.6 | 0.01 | 256 |
| | | 11(2) | 2 | 34 | 3.7 | 0.01 | 3236 |
| | | 12(1) | 2 | 41 | 2.8 | 0.01 | 3544 |
| | | 13(3) | 1 | 27 | 5.1 | 0.01 | 577 |
| | | 14(1) | 5 | 20 | 4.1 | 0.01 | 245 |
| | | 15(1) | 3 | 26 | 4.5 | 0.01 | 408 |
| | | 16(2) | 4 | 4 | 2.8 | 0.01 | 144 |
| 7 | 0.1 | | | | 3.71 | 0.07 | 1287 |
| | | 1(5) | 1 | 2 | 3.2 | 0.01 | 295 |
| | | 2(4) | 1 | 3 | 3.9 | 0.01 | 311 |
| | | 3(3) | 2 | 15 | 4.2 | 0.01 | 243 |
| | | 4(3) | 1 | 14 | 4 | 0.01 | 263 |
| | | 5(6) | 1 | 1 | 3 | 0.01 | 86 |
| | | 6(5) | 3 | 10 | 4.1 | 0.01 | 216 |
| | | 7(3) | 2 | 29 | 3.8 | 0.01 | 723 |
| | | 8(3) | 1 | 11 | 3.5 | 0.01 | 329 |
| | | 9(3) | 1 | 4 | 3.6 | 0.01 | 256 |
| | | 10(3) | 2 | 41 | 2.8 | 0.01 | 3544 |
| | | 11(3) | 1 | 27 | 5.1 | 0.01 | 577 |
| | | 12(1) | 4 | 21 | 4.1 | 0.01 | 300 |
| | | 13(1) | 2 | 27 | 5.1 | 0.01 | 701 |
| | | 14(2) | 4 | 4 | 2.8 | 0.01 | 144 |
| 8 | 0.1 | | | | 3.6 | 0.08 | 264 |
| | | 1(5) | 1 | 2 | 3.2 | 0.01 | 295 |
| | | 2(3) | 1 | 3 | 3.9 | 0.01 | 311 |
| | | 3(6) | 1 | 15 | 4 | 0.01 | 388 |
| | | 4(6) | 1 | 1 | 3 | 0.01 | 86 |
| | | 5(5) | 3 | 10 | 4.1 | 0.01 | 216 |
| | | 6(3) | 1 | 29 | 3.1 | 0.01 | 447 |
| | | 7(2) | 1 | 12 | 4.1 | 0.01 | 302 |
| | | 8(2) | 1 | 4 | 3.6 | 0.01 | 256 |
| | | 9(1) | 1 | 17 | 4.3 | 0.01 | 375 |
| | | 10(3) | 2 | 41 | 2.8 | 0.01 | 3544 |
| | | 11(3) | 1 | 27 | 5.1 | 0.01 | 577 |
| | | 12(1) | 3 | 26 | 4.3 | 0.01 | 504 |
| | | 13(1) | 1 | 28 | 3.6 | 0.01 | 479 |
| | | 14(2) | 4 | 4 | 2.8 | 0.01 | 144 |
| 9 | 0.1 | | | | 3.4 | 0.2 | 332 |
| | | 1(5) | 1 | 2 | 3.2 | 0.01 | 295 |
| | | 2(2) | 1 | 35 | 3 | 0.01 | 481 |
| | | 3(4) | 1 | 1 | 3 | 0.01 | 86 |
| | | 4(3) | 3 | 10 | 4.1 | 0.01 | 216 |
| | | 5(1) | 3 | 50 | 2.1 | 0.01 | 1139 |
| | | 6(3) | 1 | 29 | 3.1 | 0.01 | 447 |
| | | 7(3) | 1 | 17 | 4.3 | 0.01 | 375 |
| | | 8(3) | 1 | 70 | 3.5 | 0.01 | 21354 |
| | | 9(1) | 2 | 27 | 5.1 | 0.01 | 701 |
| | | 10(1) | 3 | 39 | 2.8 | 0.01 | 1671 |
| | | 11(2) | 4 | 4 | 2.8 | 0.01 | 144 |
| 10 | 0.1 | | | | 3.24 | 0.3 | 202 |
| | | 1(5) | 1 | 2 | 3.2 | 0.01 | 295 |
| | | 2(2) | 1 | 35 | 3 | 0.01 | 481 |
| | | 3(4) | 1 | 1 | 3 | 0.01 | 86 |
| | | 4(3) | 3 | 10 | 4.1 | 0.01 | 216 |
| | | 5(1) | 3 | 50 | 2.1 | 0.01 | 1139 |
| | | 6(3) | 1 | 47 | 3.4 | 0.01 | 2125 |
| | | 7(3) | 1 | 70 | 3.5 | 0.01 | 21354 |

TABLE 20-continued

| Binary sequence | Multiplier | Elementary sequence (No. of times of repeat in binary sequence) | Count of contagious 1 s in elementary sequence | Count of contagious 0 s in elementary sequence | Initial learning rate | Error threshold | Epoch count |
|---|---|---|---|---|---|---|---|
| | | 8(1) | 1 | 28 | 3.6 | 0.01 | 479 |
| | | 9(1) | 3 | 39 | 2.8 | 0.01 | 1671 |
| | | 10(2) | 4 | 4 | 2.8 | 0.01 | 144 |

To solve this problem, the total number of epochs required for modelling binary sequences is 3627 and the number of epochs required in case of parallel execution is 1287. While, to solve the same problem using standard RNN with initial learning rate of 0.1 and error threshold (mean absolute deviation) of 0.01, the number of epochs required is 12728.

Real Prediction Values

Real prediction values for next 20 time steps are set out below and these are same as expected values. Therefore, the results prove that the method proposed by embodiments of the invention is suitable for non-perfect sequence prediction with long temporal dependency.

| 0.5 | 0.6 | 0.1 | 0.2 | 0.3 | 0.5 | 0 | 0 | 0 | 0 | 0.1 | 0 |
| 0 | 0 | 0.1 | 0 | 0.3 | 0.1 | 0.2 | 0.2 | | | | |

Figure 10:
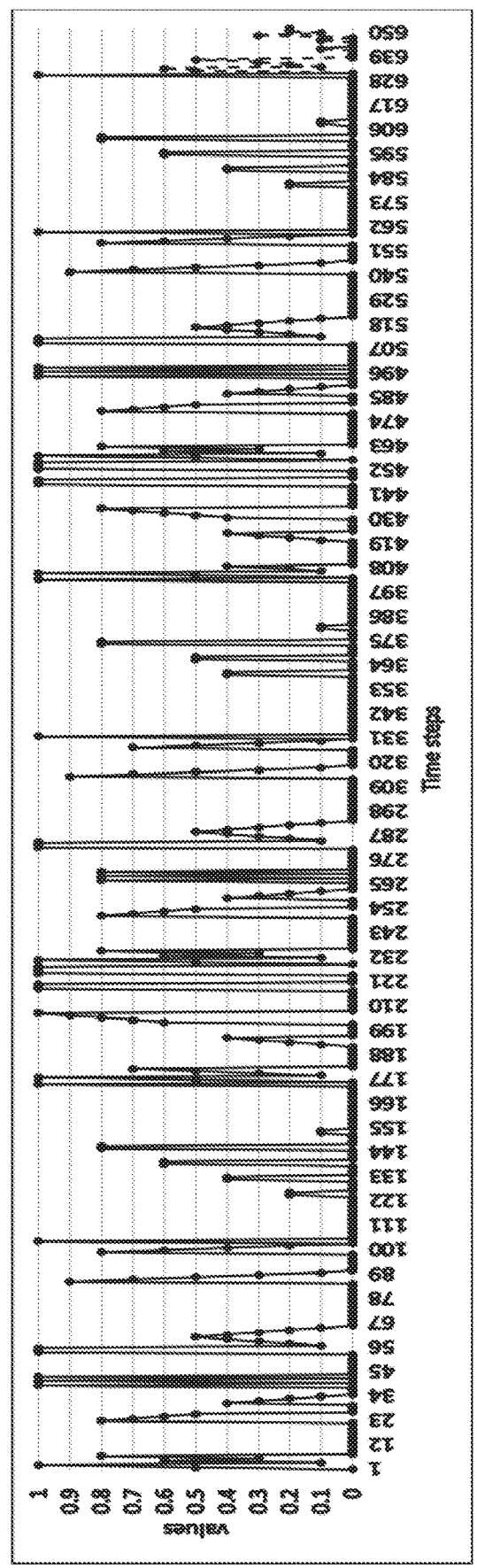
FIG. 10 is a line graph showing 20 real prediction values for a sixth target sequence alongside the sixth target sequence for visual comparison according to the test problem-4.

FIG. 10 is a line graph showing 20 real prediction values for the target sequence alongside the target sequence for visual comparison according to the test problem-4. As shown in FIG. 10, the prediction values for the next 20 time steps follow the pattern well.

Table 21 below summarizes the number of epochs required when the proposed method is used for solving the prediction problems described above and the number of epochs required when the existing standard RNN with BPTT is used for solving the same prediction problem.

TABLE 21

| Problem | Epoch count (Proposed algorithm, assuming parallel execution) | Epoch count (Proposed algorithm, sum of epochs of all binary sequences) | Epoch count (standard RNN) |
|---|---|---|---|
| Example - 1 | 221 | 773 | 272 |
| Example - 2 | 282 | 1059 | 1027 |
| Test problem - 1 | 1429 | 4077 | 6432 |
| Test problem - 2 | 845 | 2786 | 6714 |
| Test problem - 3 | 1268 | 4525 | 9138 |
| Test problem - 4 | 1287 | 3627 | 12728 |
| Total | 5332 | 16847 | 36311 |

From the results shown in Table 21 above, it can be seen that the proposed method takes only 15% of epochs of standard RNN when parallel processing is conducted. Even when sequential processing is performed, the proposed method takes 46% epochs of standard RNN.

As will be appreciated from the above, embodiments of the invention provide a method and a system for solving prediction problem. The proposed method and system may be used for prediction of a sequence with arbitrary length and arbitrary temporal dependency. In this solution, a target sequence is decomposed into a binary sequence group based on predetermined multiplier value(s). As shown in the examples described above, any sequence may be decomposed into a binary sequence group from prediction perspective without losing accuracy. The prediction results of the target sequence are then obtained based on prediction results of each binary sequence in the binary sequence group. The prediction results of each binary sequence may be obtained using a standard RNN with BPTT with initial weights which are determined based on average of weights of a group of elementary sequences generated from the composite sequence. As the initial weights determined for each composite sequence are very close to the final weights at convergence, the vanishing and exploding gradient problems in the existing solution can be solved and the convergence occurs fast without introducing any structural change. Further, as the weights of the elementary sequences may be pre-calculated and/or the modelling of the binary sequences and elementary sequences may be conducted in parallel, the computation time required for prediction will be significantly reduced.

Further, as the generic prediction problem is decomposed into a number of simpler sub-problems by generating a binary sequence group based on the target sequence associated with the prediction problem, the simpler sub-problems may be solved in parallel, it is naturally amendable for Graphic Processing Unit (GPU) based computation to solve the prediction problem very quickly.

In view of the above, embodiments of the invention provide a universal sequence prediction solution. This refutes the earlier claim that such a solution doesn't exist. Hence, the embodiments of the invention at least have the following advantages:
  a. Embodiments of the invention solve a hitherto unresolved problem.
  b. Embodiments of the invention provide a method suitable for all types of sequences.
  c. Embodiments of the invention provide a hierarchical compositional method and hence the component prediction can be run in parallel so that the computation time required will be reduced significantly.
  d. When the method proposed by embodiments of the invention is used to solve a prediction problem, especially a problem with long temporal dependency, it takes less time. Empirical evaluation shows that binary predictions involving more than 1000 memory depth takes less than 100,000 iterations.

The invention claimed is:

1. A computer-implemented method for solving a prediction problem, the method comprising:
    decomposing, by a computer system comprising at least one processor, a target sequence associated with the prediction problem into a binary sequence group which includes at least one binary sequence, wherein each binary sequence in the binary sequence group is generated based on a corresponding multiplier value;

generating, by the computer system, a plurality of elementary sequences based on each composite sequence in the binary sequence group;

determining, by the computer system, initial weights of each composite sequence in the binary sequence group based on average of weights of the corresponding elementary sequences;

determining, by the computer system, a binary prediction value for each binary sequence in the binary sequence group, wherein the binary prediction value for each composite sequence in the binary sequence group is determined by modelling each composite sequence using Recurrent neural network (RNN) based on the determined initial weights; and determining, by the computer system, a real prediction value for the target sequence based on a product of the binary prediction value for each binary sequence in the binary sequence group and the corresponding multiplier value.

2. The method according to claim 1, wherein the decomposing the target sequence into a binary sequence group comprises:
decomposing, by the computer system, the target sequence into a binary sequence group including a plurality of binary sequences,
wherein the determining a real prediction value for the target sequence comprises:
calculating, by the computer system, a product of the binary prediction value for each binary sequence in the binary sequence group and the corresponding multiplier value; and determining the real prediction value as an addition of the products corresponding to all of the binary sequences in the binary sequence group.

3. The method according to claim 1, wherein the decomposing the target sequence into a binary sequence group comprises:
Step 1: generating a current binary sequence based on a current source sequence and a current multiplier value corresponding to the current source sequence, wherein the current multiplier value is determined based on a minimum value in the current source sequence, wherein an initial sequence of the current source sequence is the target sequence;
Step 2: updating the current source sequence by subtracting the current multiplier value from each element of the current source sequence;
repeating the Steps 1 and 2 until each element of the current source sequence is zero.

4. The method according to claim 3, wherein the generating a current binary sequence based on a current source sequence and a current multiplier value comprises:
if an element of the current source sequence is greater than or equal to the current multiplier value, determining the corresponding element of the current binary sequence as 1; if the element of the current source sequence is 0, determining the corresponding element of the current binary sequence as 0.

5. The method according to claim 3, wherein the decomposing the target sequence into a binary sequence group further comprises:
swapping at least one element between two rows of a generated binary sequence group, wherein the two rows of the generated binary sequence group have a same multiplier value.

6. The method according to claim 1, wherein the generating a plurality of elementary sequences based on each composite sequence in the binary sequence group comprises:
generating a plurality of elementary sequences based on each composite sequence in the binary sequence group, wherein each of the elementary sequences starts with 1 and repeats a base sequence from a corresponding composite sequence and contains at least two and half repetitions of the base sequence.

7. The method according to claim 1, wherein the determining initial weights of each composite sequence based on average of weights of the corresponding elementary sequences, comprises:
retrieving weights of at least one elementary sequence corresponding to a first composite sequence from a pre-stored table which is stored in a memory and includes a plurality of mappings wherein each mapping associates a set of weights to an elementary sequence; and
calculating the initial weights of the first composite sequence based on the retrieved weights of the at least one elementary sequence.

8. The method according to claim 1, wherein the determining initial weights of each composite sequence based on average of weights of the corresponding elementary sequences comprises:
modelling at least one elementary sequence corresponding to a second composite sequence using RNN to obtain weights of the at least one elementary sequence; and
calculating the initial weights of the second composite sequence based on the obtained weights of the at least one elementary sequence.

9. The method according to claim 8, wherein the modelling at least one elementary sequence corresponding to a second composite sequence using RNN comprises: modelling a plurality of elementary sequences corresponding to the second composite sequence using RNN in parallel.

10. The method according to claim 1, further comprising:
determining initial learning rate of each composite sequence in the binary sequence group based on average of initial learning rates of the corresponding elementary sequences.

11. The method according to claim 1, further comprising:
determining an error threshold value for each composite sequence in the binary sequence group based on average of error threshold values of the corresponding elementary sequences.

12. The method according to claim 1, wherein the determining a binary prediction value for each binary sequence in the binary sequence group comprises: modelling each composite sequence in the binary sequence group using RNN based on the determined initial weights in parallel to determine the binary prediction value for each composite sequence.

13. A system for solving a prediction problem, the system comprising at least one processor and a memory communicably coupled to the at least one processor, wherein the memory is configured to store instructions to be executed by the at least one processor, wherein the at least one processor is configured to
decompose a target sequence associated with the prediction problem into a binary sequence group which includes at least one binary sequence, wherein each binary sequence in the binary sequence group is generated based on a corresponding multiplier value;

generate a plurality of elementary sequences based on each composite sequence in the binary sequence group;

determine initial weights of each composite sequence in the binary sequence group based on average of weights of the corresponding elementary sequences;

determine a binary prediction value for each binary sequence in the binary sequence group, wherein the binary prediction value for each composite sequence is determined by modelling each composite sequence using Recurrent neural network (RNN) based on the determined initial weights; and determine a real prediction value for the target sequence based on a product of the binary prediction value for each binary sequence in the binary sequence group and the corresponding multiplier value.

14. The system according to claim 13, wherein the at least one processor is further configured to decompose the target sequence into a binary sequence group including a plurality of binary sequences, and calculate a product of the binary prediction value for each binary sequence in the binary sequence group and the corresponding multiplier value; and determine the real prediction value for the target sequence as an addition of the products corresponding to all of the binary sequences in the binary sequence group.

15. The system according to claim 13, wherein the at least one processor is further configured to decompose the target sequence into a binary sequence group by Step 1: generating a current binary sequence based on a current source sequence and a current multiplier value corresponding to the current binary sequence, wherein the current multiplier value is determined based on a minimum value in the current source sequence, wherein the initial sequence of the current source sequence is the target sequence;

Step 2: updating the current source sequence by subtracting the current multiplier value from each element of the current source sequence;

repeating the Steps 1 and 2 until each element of the current source sequence is zero.

16. The system according to claim 15, wherein the at least one processor is further configured to determine the corresponding element of the current binary sequence as 1 if an element of the current source sequence is greater than or equal to the current multiplier value; determine the corresponding element of the current binary sequence as 0 if the element of the current source sequence is 0.

17. The system according to claim 15, wherein the at least one processor is further configured to decompose the target sequence into a binary sequence group by swapping at least one element between two rows of a generated binary sequence group, wherein the two rows of the generated binary sequence group have a same multiplier value.

18. The system according to claim 13, wherein the at least one processor is configured to generate a plurality of elementary sequences based on each composite sequence in the binary sequence group, wherein each of the elementary sequences starts with 1 and repeats a base sequence from a corresponding composite sequence and contains at least two and half repetitions of the base sequence.

19. The system according to claim 13, wherein the at least one processor is further configured to retrieve weights of at least one elementary sequence corresponding to a first composite sequence from a pre-stored table which is stored in a memory and includes a plurality of mappings wherein each mapping associates a set of weights to an elementary sequence; and calculate the initial weights of the first composite sequence based on the retrieved weights of the at least one elementary sequence.

20. The system according to claim 13, wherein the at least one processor is further configured to model at least one elementary sequence corresponding to a second composite sequence using RNN to obtain weights of the at least one elementary sequence; and calculate the initial weights of the second composite sequence based on the obtained weights of the at least one elementary sequence.

21. The system according to claim 20, wherein the system comprises a plurality of processor which are configured to model a plurality of elementary sequences corresponding to the second composite sequence using RNN in parallel.

22. The system according to claim 13, wherein the at least one processor is further configured to determine initial learning rate of each composite sequence in the binary sequence group based on average of initial learning rates of the corresponding elementary sequences.

23. The system according to claim 13, wherein the at least one processor is further configured to determine an error threshold value for each composite sequence in the binary sequence group based on average of error threshold values of the corresponding elementary sequences.

24. The system according to claim 13, wherein the system comprises a plurality of processors which are configured to model each composite sequence in the binary sequence group using RNN based on the determined initial weights in parallel to determine the binary prediction value for each composite sequence.

25. A non-transitory computer readable medium comprising computer program code for solving a prediction problem, wherein the computer program code, when executed, is configured to cause at least one processor in a computer system to perform a method according to claim 1.

* * * * *